United States Patent
Araki et al.

(10) Patent No.: US 10,062,402 B1
(45) Date of Patent: Aug. 28, 2018

(54) WAVEGUIDE INCLUDING FIRST AND SECOND LAYERS AND MANUFACTURING METHOD THEREOF

(71) Applicants: Hironori Araki, Milpitas, CA (US); Yoshitaka Sasaki, Los Gatos, CA (US); Hiroyuki Ito, Milpitas, CA (US); Shigeki Tanemura, Milpitas, CA (US); Seiichiro Tomita, Milpitas, CA (US); Masakazu Okada, Milpitas, CA (US)

(72) Inventors: Hironori Araki, Milpitas, CA (US); Yoshitaka Sasaki, Los Gatos, CA (US); Hiroyuki Ito, Milpitas, CA (US); Shigeki Tanemura, Milpitas, CA (US); Seiichiro Tomita, Milpitas, CA (US); Masakazu Okada, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 15/830,818

(22) Filed: Dec. 4, 2017

(51) Int. Cl.
| | |
|---|---|
| *G11B 7/135* | (2012.01) |
| *G11B 5/60* | (2006.01) |
| *G11B 5/31* | (2006.01) |
| *H01P 3/16* | (2006.01) |
| *G11B 5/127* | (2006.01) |
| *H01P 1/17* | (2006.01) |
| *G11B 5/00* | (2006.01) |

(52) U.S. Cl.
CPC .......... *G11B 5/6088* (2013.01); *G11B 5/1278* (2013.01); *G11B 5/3116* (2013.01); *H01P 1/174* (2013.01); *H01P 3/16* (2013.01); *G11B 2005/0021* (2013.01)

(58) Field of Classification Search
None
See application file for complete search history.

(56) References Cited

U.S. PATENT DOCUMENTS

| 8,687,469 B1* | 4/2014 | Takayama | G11B 5/105 369/13.24 |
| 9,646,639 B2* | 5/2017 | Van Orden | G11B 5/4866 |
| 2003/0118289 A1* | 6/2003 | Watts | B82Y 20/00 385/50 |

(Continued)

OTHER PUBLICATIONS

Watts, M.R., "Integrated mode-evolution-based polarization rotators," Optics Letters, pp. 138-140, vol. 30, No. 2, Jan. 15, 2005.

*Primary Examiner* — Peter Vincent Agustin
(74) *Attorney, Agent, or Firm* — Oliff PLC

(57) ABSTRACT

A manufacturing method for a waveguide includes forming a core including a first layer and a second layer. The first layer has a top surface including a first region with which a bottom surface of the second layer is in contact, and a second region with which the bottom surface of the second layer is not in contact. Forming the core includes the steps of: forming an initial first layer; forming an etching stopper layer on the second region of the initial first layer; forming an initial second layer on the initial first layer and the etching stopper layer; etching the initial second layer and the initial first layer so as to make the initial first layer into the first layer; and etching the initial second layer until the etching stopper layer is exposed, so as to make the initial second layer into the second layer.

12 Claims, 26 Drawing Sheets

(56) References Cited

U.S. PATENT DOCUMENTS

| | | | | |
|---|---|---|---|---|
| 2008/0111735 | A1* | 5/2008 | Ridgway | G01S 7/03 342/200 |
| 2009/0185459 | A1* | 7/2009 | Matsumoto | G11B 5/4826 369/13.02 |
| 2010/0118664 | A1* | 5/2010 | Nishida | G11B 5/314 369/13.33 |
| 2010/0214685 | A1* | 8/2010 | Seigler | G11B 5/02 360/59 |
| 2011/0002575 | A1* | 1/2011 | Kato | B82Y 20/00 385/3 |
| 2011/0170381 | A1 | 7/2011 | Matsumoto | |
| 2011/0292774 | A1* | 12/2011 | Osawa | G02B 6/122 369/13.33 |
| 2012/0188859 | A1* | 7/2012 | Hara | G11B 5/314 369/13.33 |
| 2013/0163942 | A1* | 6/2013 | Wiersma | B82Y 20/00 385/130 |
| 2017/0249962 | A1* | 8/2017 | Peng | G11B 5/4866 |

\* cited by examiner

WAVEGUIDE INCLUDING FIRST AND SECOND LAYERS AND MANUFACTURING METHOD THEREOF

BACKGROUND OF THE INVENTION

1. Field of the Invention

The present invention relates to a waveguide for use in thermally-assisted magnetic recording to write data on a recording medium with the coercivity thereof lowered by applying near-field light thereto, and a manufacturing method thereof.

2. Description of the Related Art

With recent increases in recording density of magnetic recording devices such as magnetic disk drives, there has been demand for improved performance of thin-film magnetic heads and recording media. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium.

To increase the recording density of a magnetic recording device, it is effective to make the magnetic fine particles of the recording medium smaller. Making the magnetic fine particles smaller, however, disadvantageously lowers the thermal stability of magnetization of the magnetic fine particles. To overcome this problem, it is effective to increase the anisotropic energy of the magnetic fine particles. However, increasing the anisotropic energy of the magnetic fine particles leads to an increase in coercivity of the recording medium, thereby making it difficult to perform data writing with existing magnetic heads.

As a solution to the problems described above, there has been proposed a technology called thermally-assisted magnetic recording. The technology uses a recording medium having high coercivity. When writing data, a write magnetic field and heat are applied almost simultaneously to the area of the recording medium where to write data, so that the area rises in temperature and drops in coercivity for data writing. The area where data is written subsequently falls in temperature and rises in coercivity to increase in thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically emitted from a laser diode mounted on the slider, and is guided, by a waveguide provided in the slider, to the plasmon generator disposed near the medium facing surface of the slider.

U.S. Patent Application Publication No. 2011/0170381 A1 discloses a thermally-assisted magnetic recording head including a plasmon generator and a waveguide. The plasmon generator has a near-field light generating surface located in the medium facing surface and a plasmon exciting section configured to excite surface plasmons thereon. The waveguide includes a core and a cladding. The core has an evanescent light generating surface for generating evanescent light. The plasmon exciting section faces the evanescent light generating surface with a gap interposed therebetween. The core generates evanescent light at the evanescent light generating surface from laser light propagating through the core. In the plasmon generator, surface plasmons are excited on the plasmon exciting section through coupling with the evanescent light, the excited surface plasmons propagate to the near-field light generating surface, and near-field light is generated from those surface plasmons at the near-field light generating surface.

To generate evanescent light of high intensity at the plasmon exciting section, the electric field of the laser light propagating through the core preferably oscillates in a direction perpendicular to the evanescent light generating surface. Hereinafter, laser light that propagates through the core and has an electric field oscillating in a direction perpendicular to the evanescent light generating surface will be referred to as TM-mode propagation light. On the other hand, laser light that propagates through the core and has an electric field oscillating in a direction parallel to the evanescent light generating surface will be referred to as TE-mode propagation light.

Laser diodes include TE-mode lasers for emitting laser light of TE-mode whose electric field oscillates in a direction parallel to an active layer, which is a layer for emitting the laser light, and TM-mode lasers for emitting laser light of TM-mode whose electric field oscillates in a direction perpendicular to the active layer. The TE-mode lasers are more commonly used and smaller in size than the TM-mode lasers.

When using the TE-mode laser as a laser diode, from the viewpoint of placement and alignment of the laser diode with respect to the slider, it is sometimes desired that the TE-mode laser be placed in such an orientation that the electric field of the TE-mode laser light oscillates in a direction parallel to the evanescent light generating surface. If a typical waveguide is used in such a case, however, the laser light reaching the evanescent light generating surface is the TE-mode propagation light, in which case it is not possible to generate evanescent light of high intensity at the plasmon exciting section.

To cope with this, a core having the function of rotating the polarization direction of light propagating therethrough may be used as the core of the waveguide. For example, such a core is disclosed by M. R. Watts and H. A. Haus in "Integrated mode-evolution-based polarization rotators", OPTIC LETTERS, Vol. 30, No. 2, pp. 138-140, 2005. The use of such a core makes it possible that laser light that is to become TE-mode propagation light enters the core, the resulting TE-mode propagation light is then transformed into TM-mode propagation light, and the resulting TM-mode propagation light reaches the evanescent light generating surface.

The core disclosed in the foregoing literature includes a first layer, and a second layer lying on the first layer. The first layer and the second layer have different shapes. To be more specific, when viewed in a direction perpendicular to the interface between the first layer and the second layer, the second layer has a shape different from and smaller than that of the first layer.

Another example of such a core including first and second layers of different shapes is one having the function of changing the beam diameter of light propagating therethrough, as disclosed in U.S. Pat. No. 8,687,469 B1, for example.

In the core including first and second layers of different shapes and having a special function as described above, the shapes of the first and second layers have an influence on the function of the core. High precision is thus required of the shapes of the first and second layers of such a core.

SUMMARY OF THE INVENTION

It is an object of the present invention to provide a waveguide including a core and a cladding and a manufacturing method thereof, the core including first and second layers that have different shapes fabricated with high precision.

A waveguide manufactured by a manufacturing method of the present invention includes a core allowing light to propagate therethrough, and a cladding around the core. The core is formed of a first dielectric material. The cladding is formed of a second dielectric material having a relative permittivity lower than that of the first dielectric material. The core includes a first layer and a second layer stacked in a first direction. Each of the first layer and the second layer has a top surface and a bottom surface. The top surface of the first layer includes a first region with which the bottom surface of the second layer is in contact, and a second region with which the bottom surface of the second layer is not in contact.

The manufacturing method for the waveguide of the present invention includes forming the core and forming the cladding. Forming the core includes: a step of forming an initial first layer which later becomes the first layer, the initial first layer having a top surface including the first region and the second region; a step of forming an etching stopper layer on the second region of the top surface of the initial first layer; a step of forming an initial second layer on the initial first layer and the etching stopper layer; a first etching step of etching the initial second layer and the initial first layer so as to make the initial first layer into the first layer; and a second etching step of etching the initial second layer until the etching stopper layer is exposed, so as to make the initial second layer into the second layer.

In the manufacturing method for the waveguide of the present invention, the etching stopper layer may be formed of a third dielectric material different from the second dielectric material and having a relative permittivity lower than that of the first dielectric material.

In the manufacturing method for the waveguide of the present invention, the first etching step may be performed by reactive ion etching. The second etching step may be performed by reactive ion etching.

In the manufacturing method for the waveguide of the present invention, forming the core may further include a step of removing at least part of the etching stopper layer after the second etching step.

In the manufacturing method for the waveguide of the present invention, the top surface of the second layer may lie entirely within the confines of edges of the top surface of the first layer when viewed in the first direction.

In the manufacturing method for the waveguide of the present invention, the core may have the function of rotating the polarization direction of the light propagating therethrough. Alternatively, the core may have the function of changing the beam diameter of the light propagating therethrough.

A waveguide of the present invention includes a core allowing light to propagate therethrough, and a cladding around the core. The core is formed of a first dielectric material. The cladding is formed of a second dielectric material having a relative permittivity lower than that of the first dielectric material. The core includes a first layer and a second layer stacked in a first direction. Each of the first layer and the second layer has a top surface and a bottom surface. The top surface of the first layer includes a first region with which the bottom surface of the second layer is in contact, and a second region with which the bottom surface of the second layer is not in contact.

The waveguide of the present invention further includes a dielectric layer interposed between the second region and the cladding. The dielectric layer is formed of a third dielectric material different from the second dielectric material and having a relative permittivity lower than that of the first dielectric material.

In the waveguide of the present invention, the top surface of the second layer may lie entirely within the confines of edges of the top surface of the first layer when viewed in the first direction.

In the waveguide of the present invention, the core may have the function of rotating the polarization direction of the light propagating therethrough. Alternatively, the core may have the function of changing the beam diameter of the light propagating therethrough.

The manufacturing method for the waveguide of the present invention provides enhanced precision of the shapes of the first and second layers while bringing the top surface of the first layer and the bottom surface of the second layer into contact with each other.

The waveguide of the present invention is provided with the dielectric layer that is interposed between the second region of the top surface of the first layer and the cladding, and not interposed between the first region of the top surface of the first layer and the bottom surface of the second layer. This provides enhanced precision of the shapes of the first and second layers while allowing the top surface of the first layer and the bottom surface of the second layer to be in contact with each other.

Other and further objects, features and advantages of the present invention will appear more fully from the following description.

DETAILED DESCRIPTION OF THE PREFERRED EMBODIMENTS

First Embodiment

Figure 3:
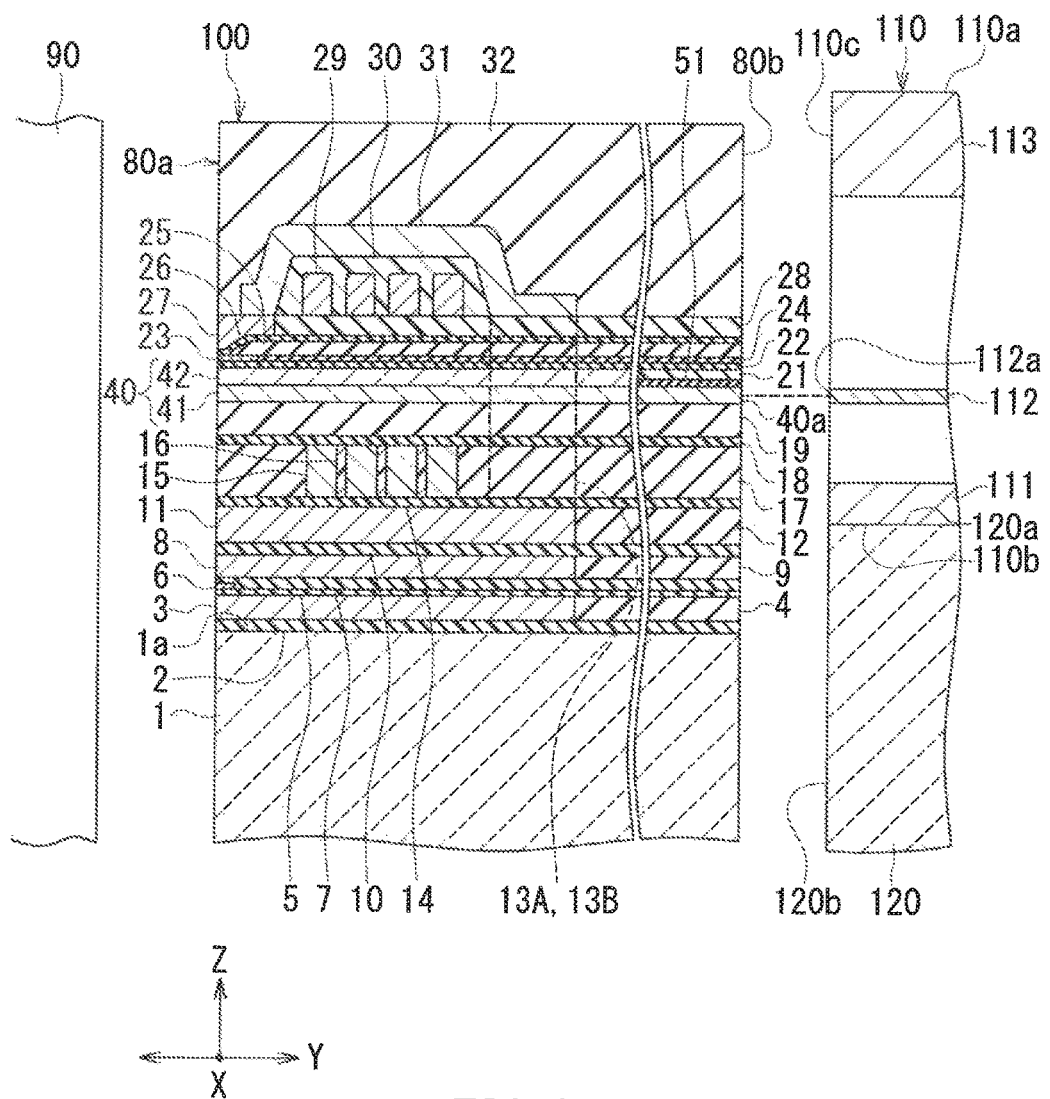
FIG. 3 is a cross-sectional view showing the configuration of the thermally-assisted magnetic recording head of the first embodiment of the invention.
Figure 4:
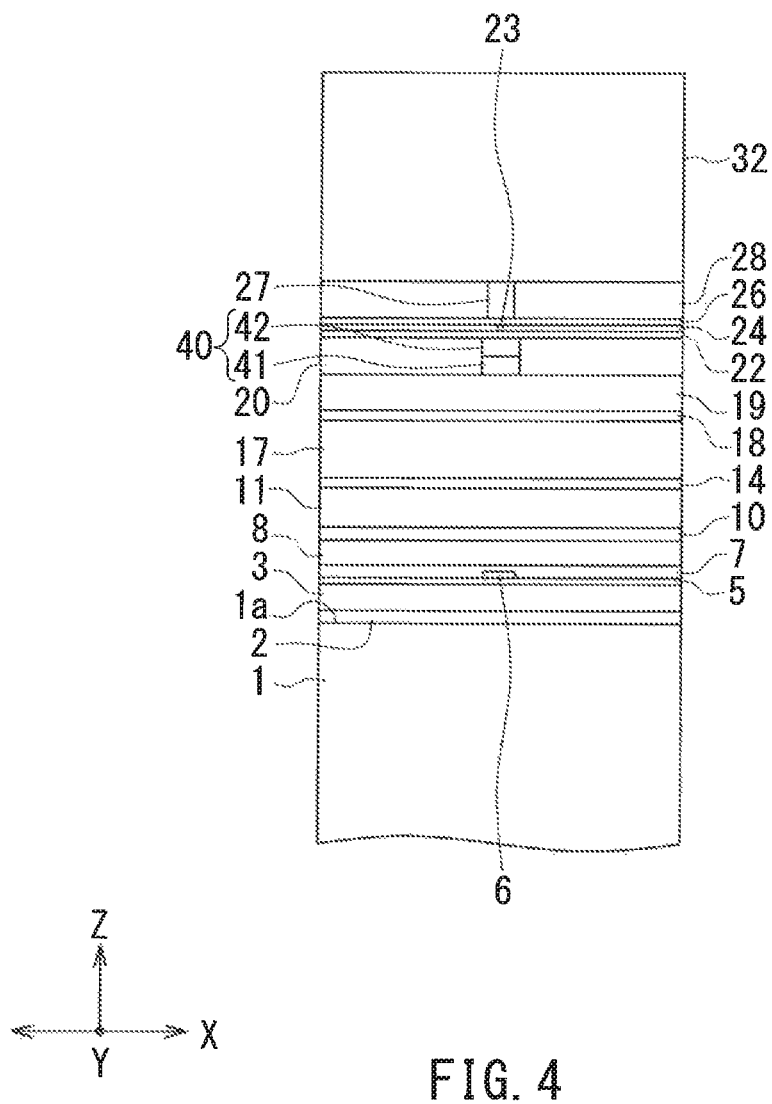
FIG. 4 is a front view showing the medium facing surface of the thermally-assisted magnetic recording head of the first embodiment of the first invention.

Preferred embodiments of the present invention will now be described in detail with reference to the drawings. First, reference is made to FIG. 3 and FIG. 4 to describe the configuration of a thermally-assisted magnetic recording head of a first embodiment of the invention. FIG. 3 is a cross-sectional view showing the configuration of the thermally-assisted magnetic recording head. FIG. 4 is a front view showing the medium facing surface of the thermally-assisted magnetic recording head.

A thermally-assisted magnetic recording head according to the present embodiment includes a slider 100 configured to fly over the surface of a recording medium 90 while the medium 90 is rotating. The slider 100 is generally hexahedron-shaped and has a medium facing surface 80a configured to face the recording medium 90, a rear surface 80b opposite thereto, and four surfaces connecting the medium facing surface 80a and the rear surface 80b. When the recording medium 90 rotates, an airflow passing between the recording medium 90 and the slider 100 causes a lift to be exerted on the slider 100. The lift causes the slider 100 to fly over the surface of the recording medium 90.

Here, we define X direction, Y direction, and Z direction as follows. The X direction is a direction across the tracks of the recording medium 90, i.e., the track width direction. The Y direction is a direction perpendicular to the medium facing surface 80a. The Z direction is the direction of travel of the recording medium 90 as viewed from the slider. The X, Y, and Z directions are orthogonal to one another. The Z direction corresponds to the first direction in the present invention.

As shown in FIG. 3 and FIG. 4, the slider 100 includes: a substrate 1 formed of a ceramic material such as aluminum oxide-titanium carbide ($Al_2O_3$—TiC) and having a top surface 1a; an insulating layer 2 formed of an insulating material and lying on the top surface 1a of the substrate 1; a bottom shield layer 3 formed of a magnetic material and lying on the insulating layer 2; and an insulating layer 4 lying on the insulating layer 2 and surrounding the bottom shield layer 3. The insulating layers 2 and 4 are formed of alumina ($Al_2O_3$), for example. The Z direction is also a direction perpendicular to the top surface 1a of the substrate 1.

For the positions of components of the slider 100, the term "above" as used herein refers to positions located in a direction that is parallel to the Z direction and away from the top surface 1a with respect to a reference position, and "below" refers to positions located in a direction that is parallel to the Z direction and toward the top surface 1a with respect to the reference position. For the surfaces of the components of the thermally-assisted magnetic recording head, the term "top surface" as used herein refers to the surface farthest from the top surface 1a, and "bottom surface" refers to the surface closest to the top surface 1a.

The slider 100 further includes: a bottom shield gap film 5 which is an insulating film lying on the top surfaces of the bottom shield layer 3 and the insulating layer 4; a magnetoresistive (MR) element 6 serving as a read element lying on the bottom shield gap film 5; two leads (not illustrated) connected to the MR element 6; and a top shield gap film 7 which is an insulating film disposed on the MR element 6.

An end of the MR element 6 is located in the medium facing surface 80a. The MR element 6 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The slider 100 further includes a top shield layer 8 formed of a magnetic material and lying on the top shield gap film 7, and an insulating layer 9 lying on the top shield gap film 7 and surrounding the top shield layer 8. The insulating layer 9 is formed of alumina, for example. The parts from the bottom shield layer 3 to the top shield layer 8 constitute a read head unit.

The slider 100 further includes a nonmagnetic layer 10 formed of a nonmagnetic material and lying on the top shield layer 8 and the insulating layer 9, and a write head unit lying on the nonmagnetic layer 10. The nonmagnetic layer 10 is formed of alumina, for example.

The write head unit includes a return pole layer 11 formed of a magnetic material and lying on the nonmagnetic layer 10, and an insulating layer 12 lying on the nonmagnetic layer 10 and surrounding the return pole layer 11. The return pole layer 11 has an end face located in the medium facing surface 80a. The insulating layer 12 is formed of alumina, for example.

The write head unit further includes two coupling sections 13A and 13B located away from the medium facing surface 80a and lying on a part of the return pole layer 11, an insulating layer 14 lying on another part of the return pole layer 11 and on the insulating layer 12, and a coil 15 lying on the insulating layer 14. The coupling sections 13A and 13B are formed of a magnetic material. Each of the coupling sections 13A and 13B includes a first layer lying on the return pole layer 11, and a second, a third, and a fourth layer stacked in this order on the first layer. The first layer of the coupling section 13A and the first layer of the coupling section 13B are arranged to be adjacent in the track width direction (the X direction). The coil 15 is wound around the first layers of the coupling sections 13A and 13B. The coil 15 is formed of a conductive material such as copper. The insulating layer 14 is formed of alumina, for example.

The write head unit further includes: an insulating layer 16 lying in the space between every adjacent turns of the coil 15; an insulating layer 17 around the coil 15; and an insulating layer 18 on the coil 15 and the insulating layers 16 and 17. The insulating layer 16 is formed of photoresist, for example. The insulating layers 17 and 18 are formed of alumina, for example. The first layers of the coupling sections 13A and 13B are embedded in the insulating layers 14 and 17.

The write head unit further includes a waveguide according to the present embodiment. The waveguide includes a core 40 allowing light to propagate therethrough, and a cladding around the core 40. As shown in FIG. 3, the core 40 has an entrance end 40a located in the rear surface 80b. Further, the core 40 includes a first layer 41 and a second layer 42 stacked in the Z direction.

The cladding includes cladding layers 19, 20, 21 and 22. The cladding layer 19 lies on the insulating layer 18. The first layer 41 of the core 40 lies on the cladding layer 19. The second layer 42 of the core 40 lies on a portion of the top surface of the first layer 41. The waveguide according to the present embodiment may further include a dielectric layer 51 lying on another portion of the top surface of the first layer 41.

The cladding layer 20 lies on the cladding layer 19 and surrounds a portion of the core 40. The cladding layer 21 lies on the cladding layer 20 and the dielectric layer 51 and surrounds another portion of the core 40. The cladding layer 22 lies on the core 40 and the cladding layers 20 and 21.

The core 40 is formed of a first dielectric material that transmits laser light to be described later. The cladding layers 19, 20, 21 and 22 are formed of a second dielectric material having a relative permittivity lower than that of the first dielectric material. Examples of the first dielectric material include tantalum oxide (TaOx) and niobium oxide (NbOx), where x represents any number larger than 0. An example of the second dielectric layer is silicon oxide ($SiO_2$).

The dielectric layer 51 is formed of a third dielectric material different from the second dielectric material and having a relative permittivity lower than that of the first dielectric material. Examples of the third dielectric material include alumina, magnesium oxide (MgO), and cerium oxide (CeOx), where x represents any number larger than 0.

The second layers of the coupling sections 13A and 13B are embedded in the insulating layer 18 and the cladding layer 19. The third layers of the coupling sections 13A and 13B are embedded in the cladding layers 20 and 21. The third layer of the coupling section 13A and the third layer of the coupling section 13B are located on opposite sides of the core 40 in the track width direction (the X direction), each being at a distance from the core 40.

The write head unit further includes a plasmon generator 23. The plasmon generator 23 lies on the cladding layer 22 in the vicinity of the medium facing surface 80a. The plasmon generator 23 is configured to excite surface plasmons thereon on the principle to be described later. The plasmon generator 23 is formed of, for example, one of Au, Ag, Al, Cu, Pd, Pt, Rh and Ir, or an alloy composed of two or more of these elements. The shape of the plasmon generator 23 will be described in detail later.

The write head unit further includes a dielectric layer 24 lying on the cladding layer 22 and surrounding the plasmon generator 23, a dielectric layer 25 disposed to cover the dielectric layer 24 and part of the plasmon generator 23, and a dielectric layer 26 lying on the plasmon generator 23 and the dielectric layer 25. The dielectric layer 25 has a top surface, and an end face closest to the medium facing surface 80a. The distance from the medium facing surface 80a to any point on the aforementioned end face of the dielectric layer 25 decreases with decreasing distance from the point to the top surface 1a of the substrate 1. The dielectric layers 24 to 26 are formed of alumina, for example.

The write head unit further includes a main pole 27 formed of a magnetic material. The main pole 27 is disposed on the dielectric layer 26 in such a manner as to ride over the aforementioned end face and part of the top surface of the dielectric layer 25. The plasmon generator 23 lies between the core 40 and the main pole 27. The main pole 27 has an end face located in the medium facing surface 80a.

The write head unit further includes a dielectric layer 28 disposed around the main pole 27. The fourth layers of the coupling sections 13A and 13B are embedded in the cladding layer 22 and the dielectric layers 24 to 26 and 28. The top surfaces of the main pole 27, the dielectric layer 28 and the fourth layers of the coupling sections 13A and 13B are even with each other. The dielectric layer 28 is formed of silicon oxide, for example.

The write head unit further includes a coil 29 lying on the dielectric layer 28, an insulating layer 30 disposed to cover the coil 29, and a yoke layer 31 formed of a magnetic material and lying on the main pole 27, the coupling sections 13A and 13B, the dielectric layer 28 and the insulating layer 30. The yoke layer 31 magnetically couples the main pole 27 to the coupling sections 13A and 13B. The coil 29 is wound around portions of the yoke layer 31 that are located on the coupling sections 13A and 13B. The coil 29 is formed of a conductive material such as copper. The insulating layer 30 is formed of photoresist, for example.

The coils 15 and 29 produce magnetic fields corresponding to data to be written on the recording medium 90. The return pole layer 11, the coupling sections 13A and 13B, the yoke layer 31 and the main pole 27 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 27. The main pole 27 passes the magnetic flux corresponding to the magnetic field produced by the coil 15 and the magnetic flux corresponding to the magnetic field produced by the coil 29, and produces a write magnetic field for use to write data on the recording medium 90 by means of a perpendicular magnetic recording system.

The slider 100 further includes a protective layer 32 disposed to cover the write head unit. The protective layer 32 is formed of alumina, for example.

The thermally-assisted magnetic recording head further includes a laser diode 110 serving as a light source for emitting laser light, and a support member 120 for supporting the laser diode 110. The support member 120 is formed of a ceramic material such as aluminum oxide-titanium carbide and has a top surface 120a and a bond surface 120b. The bond surface 120b is the surface to be bonded to the rear surface 80b of the slider 100. The top surface 120a is perpendicular to the bond surface 120b and parallel to the top surface 1a of the substrate 1. The laser diode 110 is mounted on the top surface 120a.

The laser diode 110 has a multilayer structure including a lower electrode 111, an active layer 112, and an upper electrode 113. The active layer 112 has a bottom surface facing toward the lower electrode 111, and a top surface facing toward the upper electrode 113. The laser diode 110 has a bottom surface 110a, a top surface 110b, and an exit end face 110c connecting the top surface 110b and the bottom surface 110a. The bottom surface 110a faces toward the top surface 120a of the support member 120. The exit end face 110c faces toward the rear surface 80b of the slider 100. The exit end face 110c includes an exit portion 112a for the laser light, which is located at an end of the active layer 112. The laser diode 110 and the core 40 are positioned with respect to each other so that the laser light emitted from the laser diode 110 will impinge onto the entrance end 40a of the core 40.

When a predetermined voltage is applied to the laser diode 110 through the lower electrode 111 and the upper electrode 113, laser light is emitted from the exit portion 112a of the laser diode 110. In the present embodiment, the laser diode 110 emits laser light of TE-mode, that is, linearly polarized light whose electric field oscillates in a direction parallel to the top surface and the bottom surface of the active layer 112, from the exit portion 112a. The laser diode 110 is placed in such an orientation that the top surface and the bottom surface of the active layer 112 are parallel to the XY plane. Thus, the electric field of the laser light emitted from the exit portion 112a is parallel to the XY plane.

Figure 1:
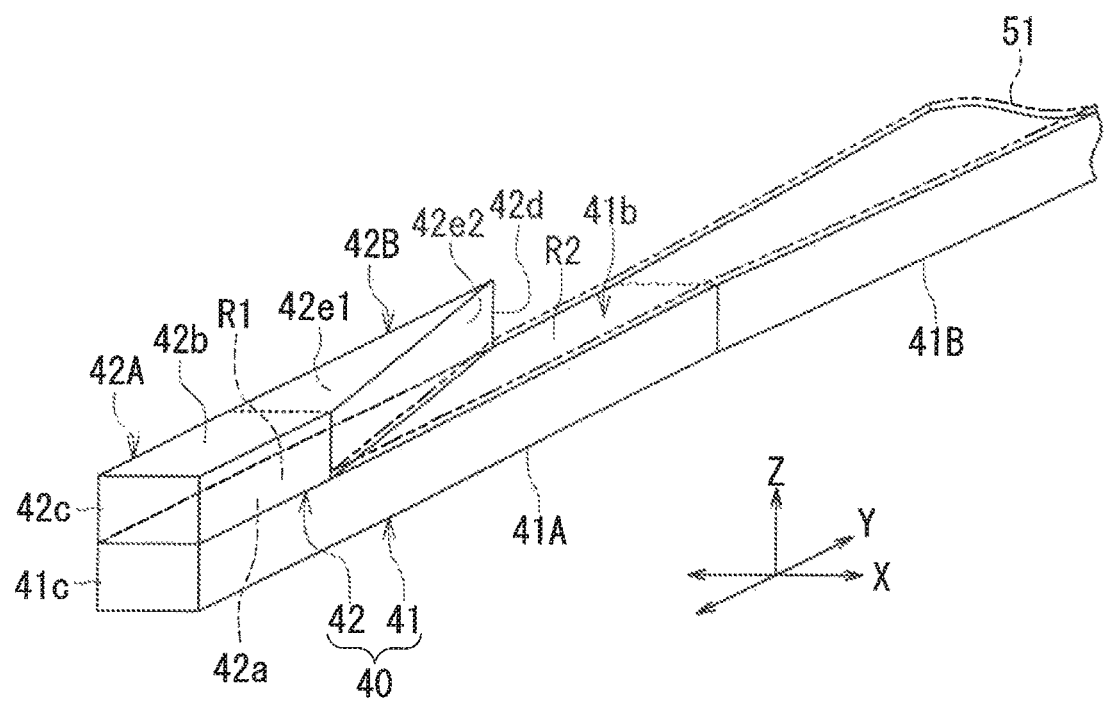
FIG. 1 is a perspective view showing a core and a dielectric layer of a waveguide according to a first embodiment of the invention.
Figure 2:
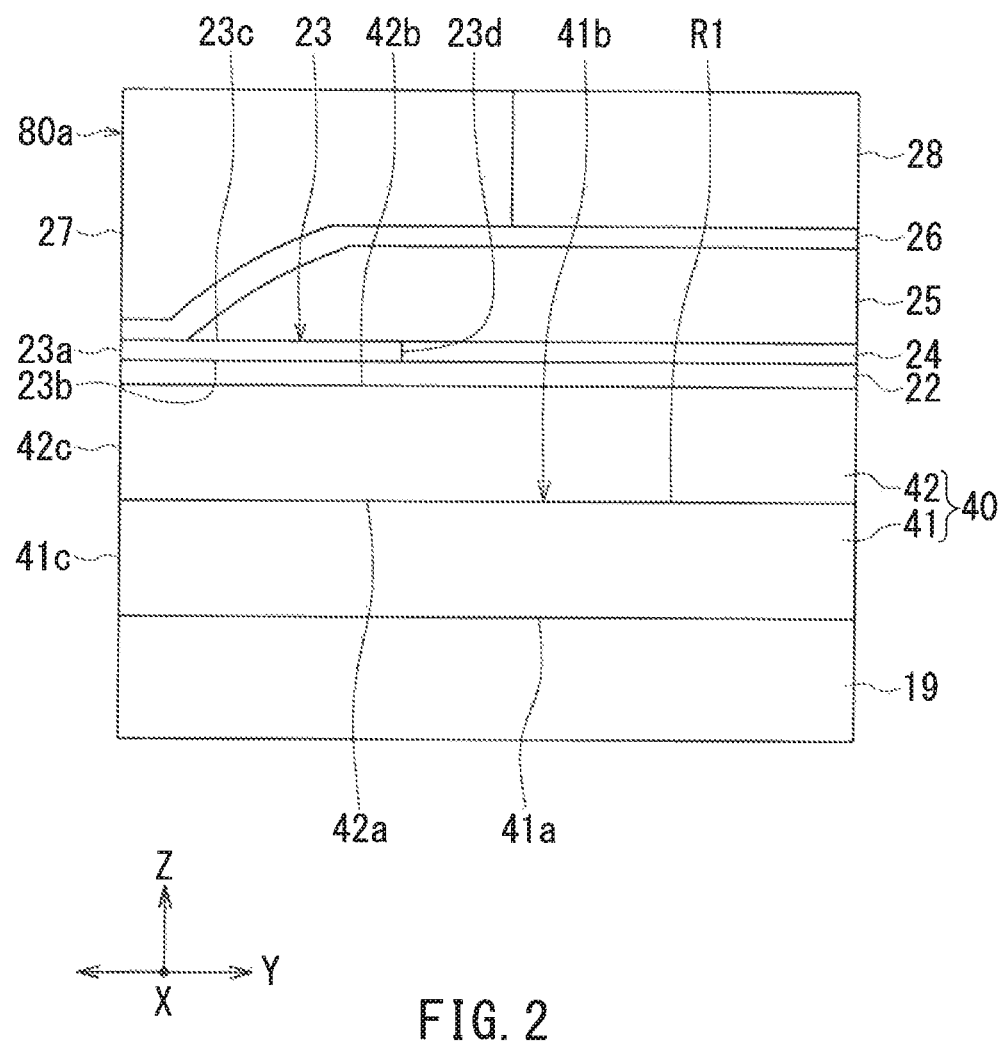
FIG. 2 is a cross-sectional view showing the main part of a thermally-assisted magnetic recording head of the first embodiment of the invention.

The shape of the core 40 according to the present embodiment will now be described in detail with reference to FIG. 1 to FIG. 3. FIG. 1 is a perspective view showing the core 40 and the dielectric layer 51 of the waveguide. FIG. 2 is a cross-sectional view showing the main part of the thermally-assisted magnetic recording head. The X, Y and Z directions described previously are also shown in FIG. 1 and FIG. 2. It should be noted that the proportions of the dimensions in the X, Y, and Z directions of the elements of the waveguide shown in FIG. 1 do not necessarily correspond to the actual proportions.

As shown in FIG. 1 to FIG. 3, the first layer 41 of the core 40 has a bottom surface 41a, a top surface 41b, a front end face 41c closer to the medium facing surface 80a, and a rear end face located in the rear surface 80b. The bottom surface 41a and the top surface 41b are parallel to the XY plane. The front end face 41c is located in the medium facing surface 80a. The entrance end 40a of the core 40 is composed of the rear end face of the first layer 41. The thickness (the dimension in the Z direction) of the first layer 41 is substantially constant regardless of distance from the medium facing surface 80a, and falls within the range of, for example, 100 to 400 nm.

As shown in FIG. 1, the first layer 41 may include a constant width portion 41A, and a width-changing portion 41B which is located farther from the medium facing surface 80a than is the constant width portion 41A. In FIG. 1, the boundary between the constant width portion 41A and the width-changing portion 41B in the top surface 41b is indicated with a dotted line. The second layer 42 of the core 40 lies on the constant width portion 41A. The length of the core 40 in a direction perpendicular to the medium facing surface 80a (the Y direction) falls within the range of 150 to 200 µm, for example. The length of the constant width portion 41A in the direction perpendicular to the medium facing surface 80a (the Y direction) falls within the range of 20 to 80 µm, for example.

As used herein, width refers to the dimension in the X direction of something. The width of the constant width portion 41A is substantially constant regardless of distance from the medium facing surface 80a, and falls within the range of, for example, 100 to 800 nm. The width of the width-changing portion 41B is equal to the width of the constant width portion 41A at the boundary with the constant width portion 41A, and increases with increasing distance from the medium facing surface 80a. The end face of the width-changing portion 41A farthest from the medium facing surface 80a constitutes the rear end face of the first layer 41, that is, the entrance end 40a of the core 40. The width of the entrance end 40a is on the order of 4 µm, for example. This provides enhanced use efficiency of laser light impinging on the entrance end 40a when the laser light has, at the entrance end 40a, an elliptical shape having a major axis oriented in the X direction.

The shape of the first layer 41 is not limited to the above-described one having the constant width portion 41A and the width-changing portion 41B, and may be such that the width of the entire first layer 41 is substantially constant regardless of distance from the medium facing surface 80a.

As shown in FIG. 1 and FIG. 2, the second layer 42 of the core 40 has a bottom surface 42a, a top surface 42b, a front end face 42c closer to the medium facing surface 80a, and a rear end 42d opposite to the front end face 42c. The bottom surface 42a and the top surface 42b are parallel to the XY direction. The front end face 42c is located in the medium facing surface 80a. The rear end 42d is located at a distance from the rear surface 80b. The thickness (the dimension in the Z direction) of the second layer 42 is substantially constant regardless of distance from the front end face 42c, and falls within the range of, for example, 200 to 500 nm.

The second layer 42 includes a constant width portion 42A, and a width-changing portion 42B which is located farther from the medium facing surface 80a than is the constant width portion 42A. In FIG. 1, the boundary between the constant width portion 42A and the width-changing portion 42B in the top surface 42b is indicated with a dotted line. The width of the constant width portion 42A is substantially constant regardless of distance from the medium facing surface 80a, and falls within the range of, for example, 100 to 800 nm. The width of the width-changing portion 42B is equal to the width of the constant width portion 42A at the boundary with the constant width portion 42A, and decreases with increasing distance from the medium facing surface 80a.

The width-changing portion 42B has two side surfaces 42e1 and 42e2. The side surface 42e1 is parallel to the YZ plane. The side surface 42e2 is perpendicular to the top surface 1a of the substrate 1, and is inclined with respect to the YZ plane. The rear end 42d is an edge formed by the side surfaces 42e1 and 42e2 intersecting each other.

The top surface 41b of the first layer 41 includes a first region R1 with which the bottom surface 42a of the second layer 42 is in contact, and a second region R2 with which the bottom surface 42a of the second layer 42 is not in contact. When the waveguide includes the dielectric layer 51, the dielectric layer 51 is interposed between the second region R2 and the cladding layer 21 (see FIG. 3). Since the cladding layer 21 is part of the cladding, one can say that the dielectric layer 51 is interposed between the second region R2 and the cladding. The dielectric layer 51 is not interposed between the first region R1 and the bottom surface 42a of the second layer 42. The thickness (the dimension in the Z direction) of the dielectric layer 51 falls within the range of 5 to 50 nm, for example.

In the present embodiment, the top surface 42b of the second layer 42 lies entirely within the confines of edges of the top surface 41b of the first layer 41 when viewed in the Z direction. When viewed in the Z direction, the edges of a portion of the top surface 42b of the second layer 42 included in the constant width portion 42A, except the boundary between the constant width portion 42A and the width-changing portion 42B, coincide with the edges of the top surface 41b of the first layer 41.

The core 40 includes a single-layered portion in which the second layer 42 is not present when viewed in the Z direction, and a two-layered portion in which the second layer 42 and part of the first layer 41 are present when viewed in the Z direction.

An example of the shape of the plasmon generator 23 will now be described with reference to FIG. 2. The plasmon generator 23 has a near-field light generating surface 23a located in the medium facing surface 80a, a plasmon exciting section 23b serving as a bottom surface, a top surface 23c, a rear end face 23d located opposite to the near-field light generating surface 23a, and two side surfaces. The near-field light generating surface 23a is located between the end face of the main pole 27 and the front end face 42c of the second layer 42. The near-field light generating surface 23a generates near-field light on the principle to be described later. The plasmon exciting section 23b is located at a predetermined distance from the top surface 42b of the second layer 42 of the core 40 and faces the top surface 42b. The cladding layer 22 is interposed between the top surface 42b of the second layer 42 and the plasmon exciting section 23b. For example, the plasmon generator 23 is generally rectangular in cross section parallel to the medium facing surface 80a. The thickness (the dimension in the Z direction) of the plasmon generator 23 is substantially constant regardless of distance from the medium facing surface 80a.

Although not illustrated, the plasmon generator 23 may include a narrow portion located in the vicinity of the medium facing surface 80a, and a wide portion which is located farther from the medium facing surface 80a than is the narrow portion. The width of the narrow portion may be constant regardless of distance from the medium facing surface 80a, or may decrease with decreasing distance to the medium facing surface 80a. The wide portion is located on a side of the narrow portion opposite from the near-field light generating surface 23a, and is coupled to the narrow portion. The wide portion has an equal width to the width of the narrow portion at the position of boundary between the wide portion and the narrow portion, and has a greater width than the width of the narrow portion at other positions.

The width of the near-field light generating surface 23a is defined by the width of the narrow portion in the medium facing surface 80a. The width of the near-field light generating surface 23a falls within the range of 5 to 40 nm, for example. The height (the dimension in the Z direction) of the near-field light generating surface 23a is defined by the height of the narrow portion in the medium facing surface 80a. The height of the near-field light generating surface 23a falls within the range of 5 to 40 nm, for example.

Now, the principle of generation of near-field light in the present embodiment and the principle of thermally-assisted magnetic recording using near-field light will be described in detail. Laser light emitted from the exit portion 112a of the laser diode 110 enters the first layer 41 of the core 40 through the entrance end 40a. The laser light propagates through the single-layered portion and the two-layered portion of the core 40 sequentially, and reaches the vicinity of the plasmon generator 23. The top surface 42b of the second layer 42 generates evanescent light from the laser light propagating through the core 40. More specifically, the laser light is totally reflected at the top surface 42b of the second layer 42, and this causes the top surface 42b of the second layer 42 to generate evanescent light that permeates into the cladding layer 22. In the plasmon generator 23, surface plasmons are excited on the plasmon exciting section 23b through coupling with the aforementioned evanescent light. The excited surface plasmons propagate to the near-field light generating surface 23a, and the near-field light generating surface 23a generates near-field light from those surface plasmons.

The near-field light generated at the near-field light generating surface 23a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 27 for data writing.

Now, a description will be given of the polarization direction of laser light in the present embodiment. The polarization direction of laser light refers to the direction of oscillation of the electric field of the laser light. As described previously, the laser light emitted from the exit portion 112a of the laser diode 110 is laser light of TE-mode whose electric field oscillates in a direction parallel to the XY plane. The laser light enters the single-layered portion of the core 40 through the entrance end 40a. At this time, the direction of oscillation of the electric field of the laser light is parallel to the XY plane, that is, parallel to the top surface 41b of the first layer 41.

In the present embodiment, the core 40 has the function of rotating the polarization direction of the light propagating therethrough. To be more specific, the direction of oscillation of the electric field of the laser light propagating through the core 40 is changed, while the laser light propagates through the two-layered portion of the core 40, from the direction parallel to the XY plane to a direction perpendicular to the XY plane, that is, to a direction perpendicular to the top surface 42b of the second layer 42. This enables generation of surface plasmons of high intensity by the plasmon generator 23.

A manufacturing method for the thermally-assisted magnetic recording head of the present embodiment will now be described with reference to FIGS. 3 and 4. The manufacturing method for the thermally-assisted magnetic recording head includes the step of fabricating a plurality of sliders 100 and the step of bonding the support member 120 with the laser diode 110 mounted thereon to each of the plurality of sliders 100. The step of fabricating a plurality of sliders 100 includes the steps of: forming components of the plurality of sliders 100, except the substrates 1, on a single wafer including portions to become the substrates 1 of the plurality of sliders 100, thereby fabricating a substructure including pre-slider portions arranged in a plurality of rows, the pre-slider portions becoming individual sliders 100 later; and cutting the substructure to separate the pre-slider portions from each other and forming the medium facing surface 80 and the rear surface 80b for each of the pre-slider portions (this step will be referred to as the step of forming the medium facing surface 80a and the rear surface 80b). The plurality of sliders 100 are fabricated in this manner.

The step of fabricating the sliders 100 of the present embodiment will be described in more detail below with attention focused on a single slider 100. In this step, first, the insulating layer 2 is formed on the substrate 1. The bottom shield layer 3 is then formed on the insulating layer 2. Then, the insulating layer 4 is formed to cover the bottom shield layer 3. The insulating layer 4 is then polished by, for example, chemical mechanical polishing (hereinafter referred to as CMP), until the bottom shield layer 3 is exposed.

Then, the bottom shield gap film 5 is formed over the bottom shield layer 3 and the insulating layer 4. On the bottom shield gap film 5, the MR element 6 and two leads (not illustrated) connected to the MR element 6 are formed. Next, the top shield gap film 7 is formed to cover the MR element 6 and the leads. The top shield layer 8 is then formed on the top shield gap film 7. Then, the insulating layer 9 is formed to cover the top shield layer 8. The insulating layer 9 is then polished by, for example, CMP, until the top shield layer 8 is exposed.

Then, the nonmagnetic layer 10 is formed over the top shield layer 8 and the insulating layer 9. The return pole layer 11 is then formed on the nonmagnetic layer 10. Then, the insulating layer 12 is formed to cover the return pole layer 11. The insulating layer 12 is then polished by, for example, CMP, until the return pole layer 11 is exposed. Then, the insulating layer 14 is formed over the return pole layer 11 and the insulating layer 12.

The insulating layer 14 is then selectively etched to form therein two openings for exposing the top surface of the return pole layer 11. Then, the first layers of the coupling sections 13A and 13B are formed on the return pole layer 11 at the positions of the two openings. The coil 15 is then formed on the insulating layer 14. The insulating layer 16 is then formed in the space between every adjacent turns of the coil 15. Then, the insulating layer 17 is formed over the entire top surface of the layered structure. The insulating layer 17 is then polished by, for example, CMP, until the first layers of the coupling sections 13A and 13B, the coil 15, and the insulating layer 16 are exposed. The insulating layer 18 is then formed over the first layers of the coupling sections 13A and 13B, the coil 15, and the insulating layers 16 and 17.

The insulating layer 18 is then selectively etched to form therein two openings for exposing the top surfaces of the first layers of the coupling sections 13A and 13B. The second layers of the coupling sections 13A and 13B are then formed on the first layers of the coupling sections 13A and 13B.

Reference is now made to FIGS. 5A to 12C to describe steps to be performed after the formation of the second layers of the coupling sections 13A and 13B up to the formation of the cladding layer 22. The following description includes a description of the manufacturing method for the waveguide according to the present embodiment. FIGS. 5A to 12C each show a cross section of a layered structure formed in the process of manufacturing the slider 100, the cross section being perpendicular to the Y direction.

FIG. nA (n is an integer between 5 and 12 inclusive) shows a cross section taken at the location at which the medium facing surface 80a is to be formed. FIG. nB shows a cross section corresponding to the location intersecting the width-changing portion 42B of the second layer 42 of the core 40. FIG. nC shows a cross section taken at the location at which the rear surface 80b is to be formed. FIGS. nA, nB, and nC omit the illustration of portions that are located on the substrate 1 side relative to the cladding layer 19.

Figure 5A:
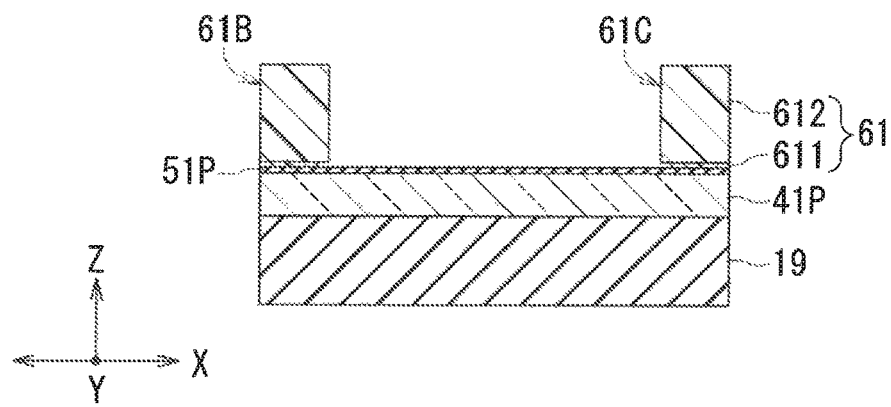
FIGS. 5A to 5C are cross-sectional views showing a step of a manufacturing method for the waveguide according to the first embodiment of the invention.
Figure 5B:
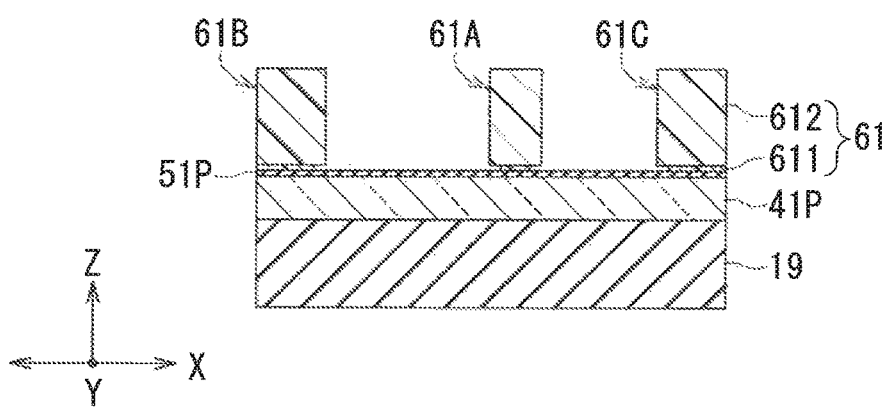
Figure 5C:
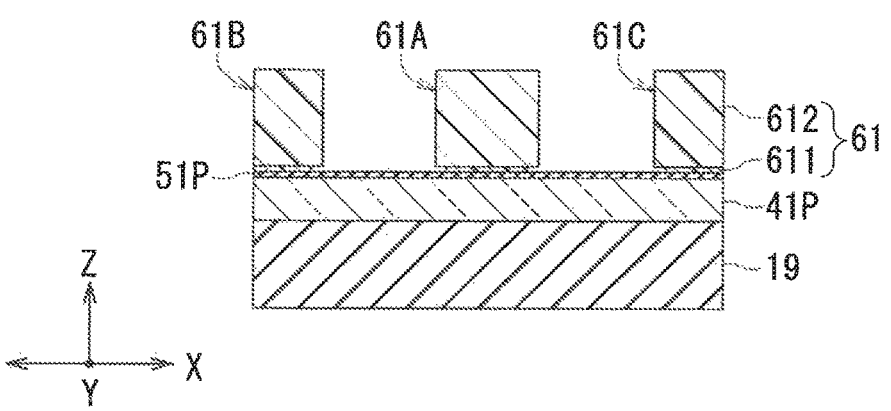

FIGS. 5A to 5C show a step following the formation of the second layers of the coupling sections 13A and 13B. In this step, first, the cladding layer 19 is formed to cover the second layers of the coupling sections 13A and 13B. The cladding layer 19 is then polished by, for example, CMP, until the second layers of the coupling sections 13A and 13B are exposed. On the cladding layer 19, an initial first layer 41P is formed using the first dielectric material. The initial first layer 41P has a top surface including the first region R1 and the second region R2, and later becomes the first layer 41. Then, a dielectric layer 51P is formed on the initial first layer 41P.

Next, an etching mask 61 is formed on the dielectric layer 51P. The etching mask 61 has an undercut. The etching mask 61 includes, for example, a lower layer 611 lying on the dielectric layer 51P and an upper layer 612 lying on the lower layer 611. The upper layer 612 is formed of a photoresist patterned by photolithography. The lower layer 611 is formed of, for example, a material that dissolves in a developing solution that is to be used in patterning the upper layer 612.

The etching mask 61 includes a first portion 61A, a second portion 61B, and a third portion 61C, the second and third portions 61B and 61C being located on opposite sides of the first portion 61A in the X direction. The planar shape of the first portion 61A corresponds to the shape of the second region R2 of the top surface 41b of the first layer 41 of the core 40. The planar shape refers to the shape as viewed from above.

Figure 6A:
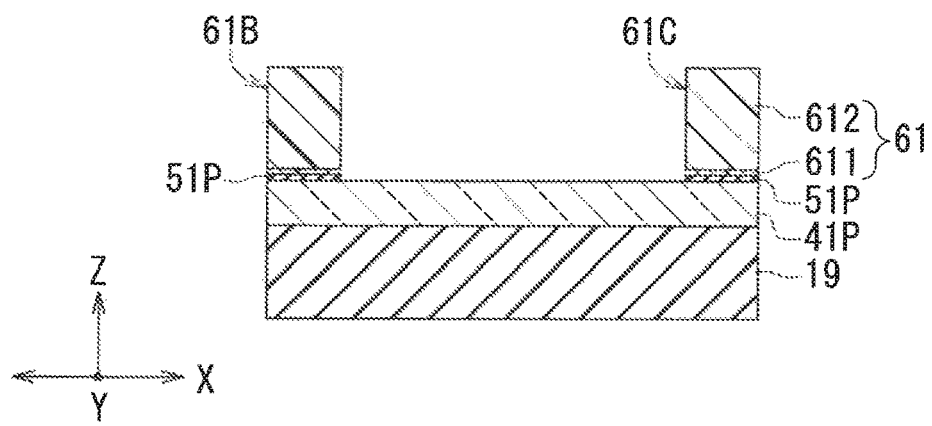
FIGS. 6A to 6C are cross-sectional views showing a step that follows the step shown in FIGS. 5A to 5C.
Figure 6B:
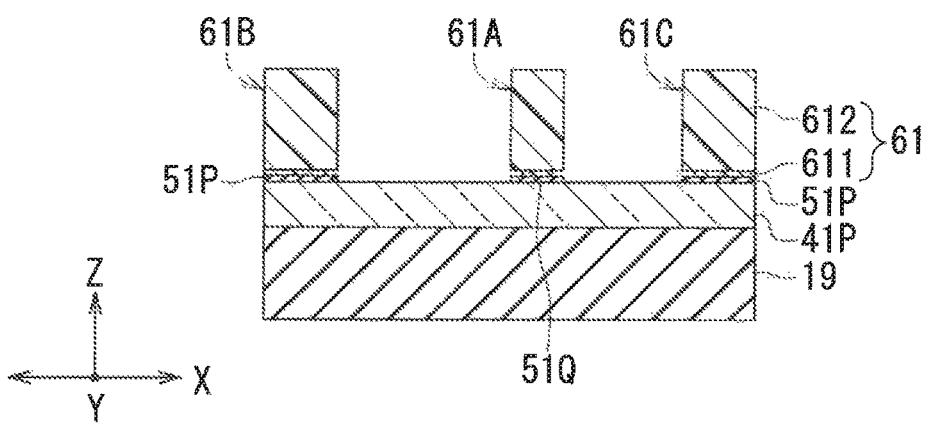
Figure 6C:
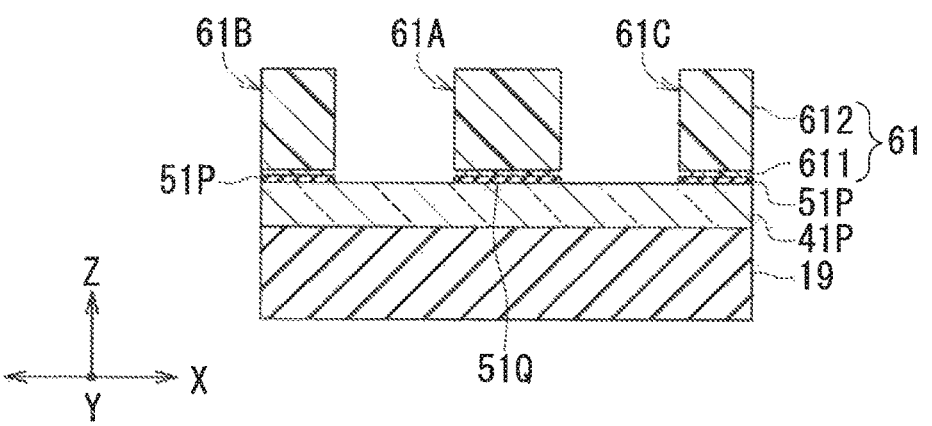

FIGS. 6A to 6C show the next step. In this step, first, a portion of the dielectric layer 51P that is not covered with the etching mask 61 is removed by, for example, ion beam etching (hereinafter referred to as IBE). A portion of the remainder of the dielectric layer 51P that lies under the first portion 61A of the etching mask 61 is an etching stopper layer 51Q to be used in a later step. The etching stopper layer 51Q lies on the second region R2 of the top surface of the initial first layer 41P. Then, the etching mask 61 is removed.

Figure 7A:
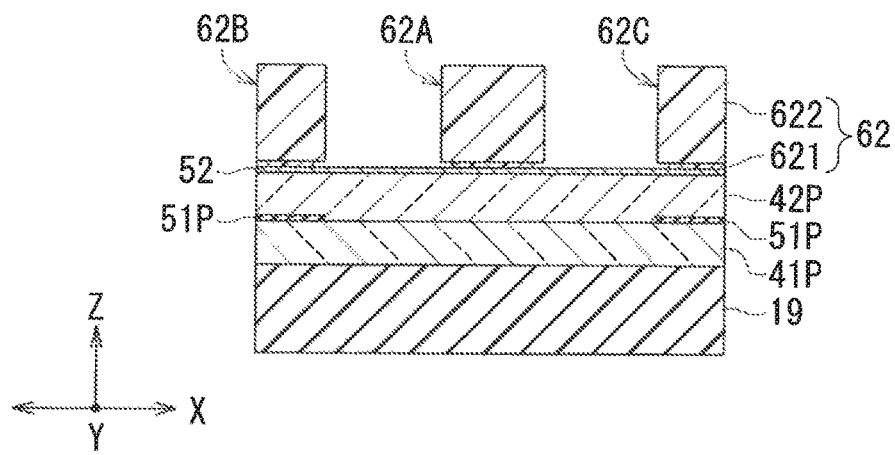
FIGS. 7A to 7C are cross-sectional views showing a step that follows the step shown in FIGS. 6A to 6C.
Figure 7B:
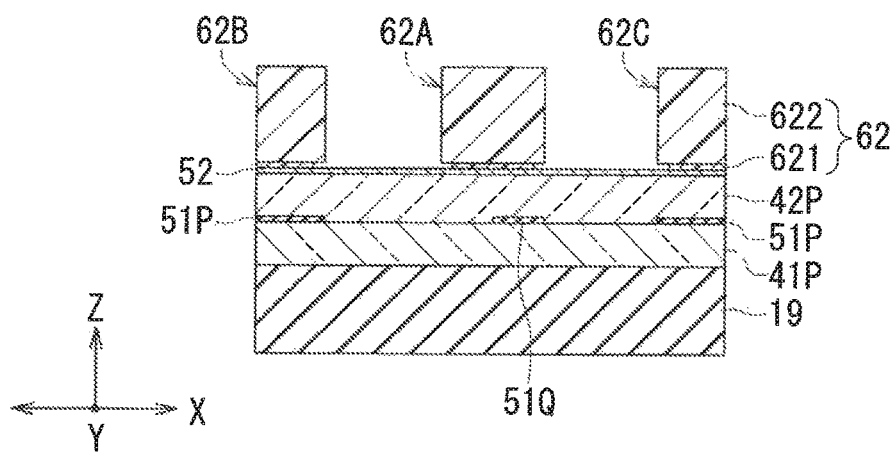
Figure 7C:
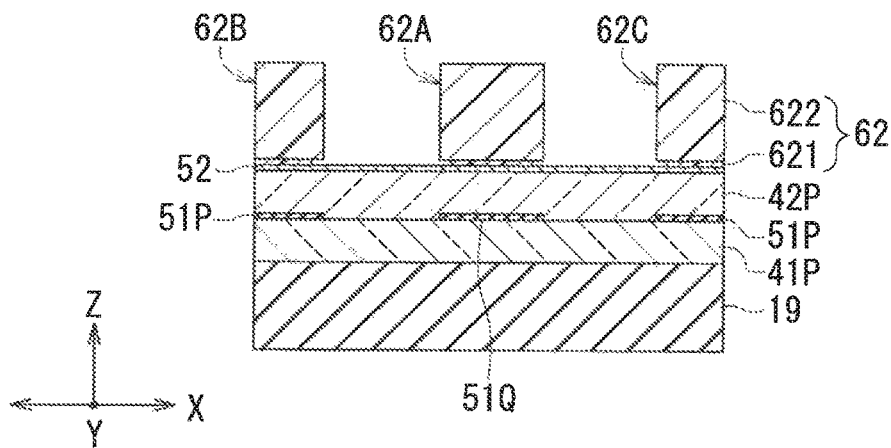

FIGS. 7A to 7C show the next step. In this step, first, an initial second layer 42P is formed, using the first dielectric material, on the initial first layer 41P and the dielectric layer 51P including the etching stopper layer 51Q. Then, a first nonmagnetic metal layer 52 of a nonmagnetic metal material such as Ru is formed on the initial second layer 42P. For example, the first nonmagnetic metal layer 52 is 50 nm in thickness (dimension in the Z direction).

Next, an etching mask 62 is formed on the first nonmagnetic metal layer 52. The etching mask 62 has an undercut. The etching mask 62 includes, for example, a lower layer 621 lying on the first nonmagnetic metal layer 52 and an upper layer 622 lying on the lower layer 621. The lower layer 621 and the upper layer 622 are formed of the same materials as those of the lower layer 611 and the upper layer 612, respectively.

The etching mask 62 includes a first portion 62A, a second portion 62B, and a third portion 62C, the second and third portions 62B and 62C being located on opposite sides of the first portion 62A in the X direction. The planar shape of the first portion 62A corresponds to the planar shape of the first layer 41 of the core 40.

Figure 8A:
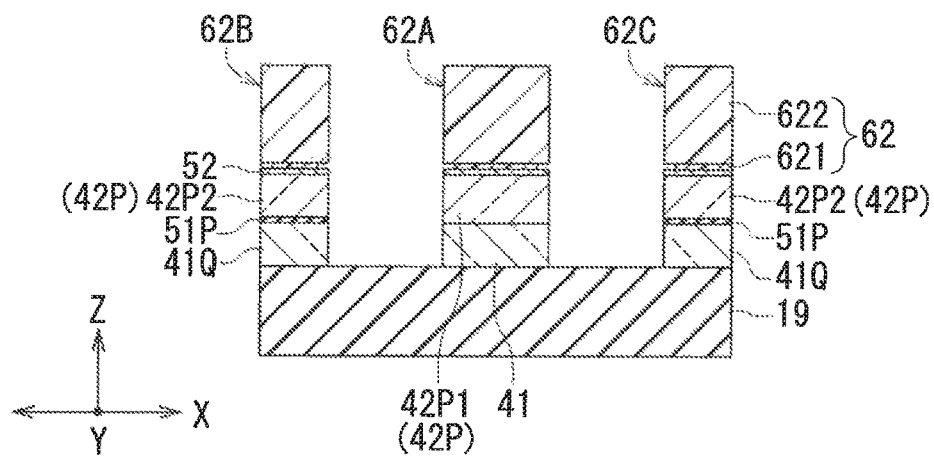
FIGS. 8A to 8C are cross-sectional views showing a step that follows the step shown in FIGS. 7A to 7C.
Figure 8B:
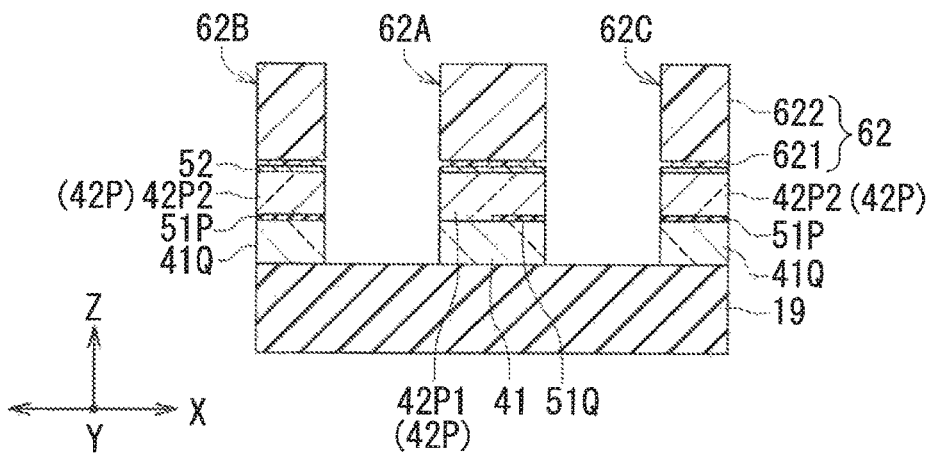
Figure 8C:
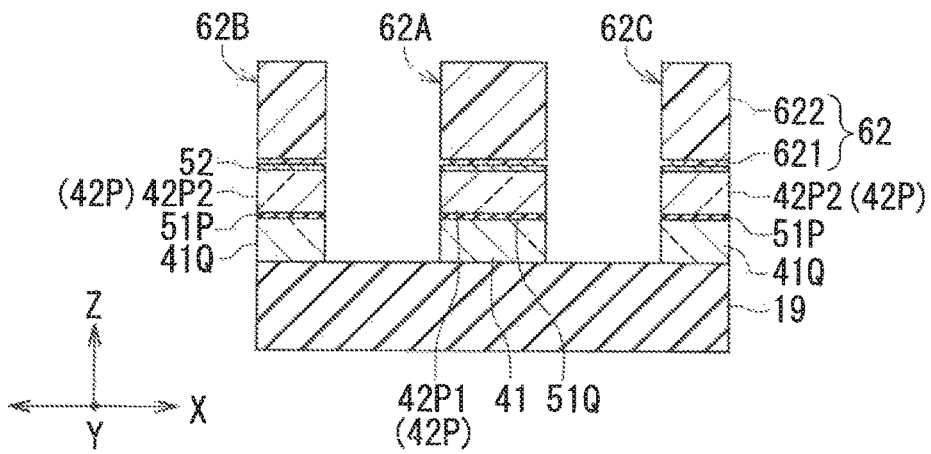

FIGS. 8A to 8C show the next step. In this step, first, a portion of the first nonmagnetic metal layer 52 that is not covered with the etching mask 62 is removed by, for example, IBE. Next performed is a first etching step of etching the initial second layer 42P and the initial first layer 41P using the etching mask 62, so as to make the initial first layer 41P into the first layer 41. The first etching step is performed by reactive ion etching (hereinafter referred to as ME) and continues until the cladding layer 19 is exposed. Next, the etching mask 62 is removed using an etch stripping solution.

As a result of the first etching step, a portion of of the initial first layer 41P that remains under the first portion 62A of the etching mask 62 makes the first layer 41. As shown in FIGS. 8A to 8C, other portions of the initial first layer 41P remain under the second and third portions 62B and 62C of the etching mask 62. These portions will be referred to as remaining portions and denoted by the symbol 41Q.

The first etching step divides the initial second layer 42P into a portion 42P1 under the first portion 62A of the etching mask 62 and portions 42P2 under the second and third portions 62B and 62C of the etching mask 62.

Figure 9A:
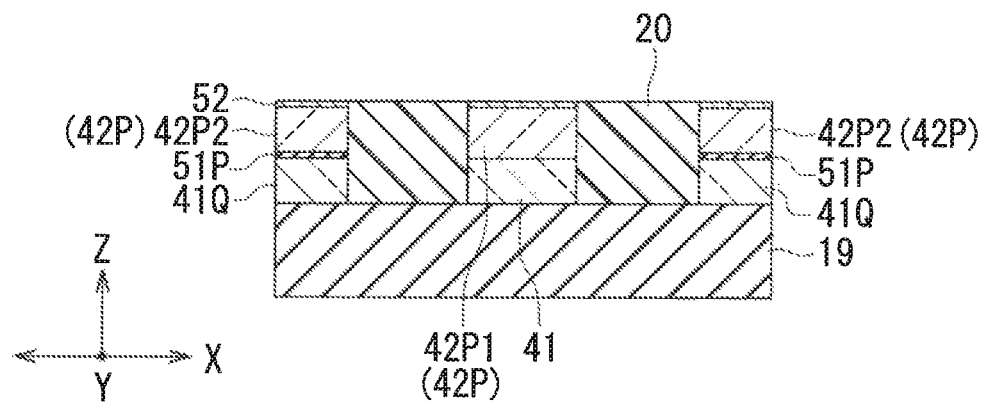
FIGS. 9A to 9C are cross-sectional views showing a step that follows the step shown in FIGS. 8A to 8C.
Figure 9B:
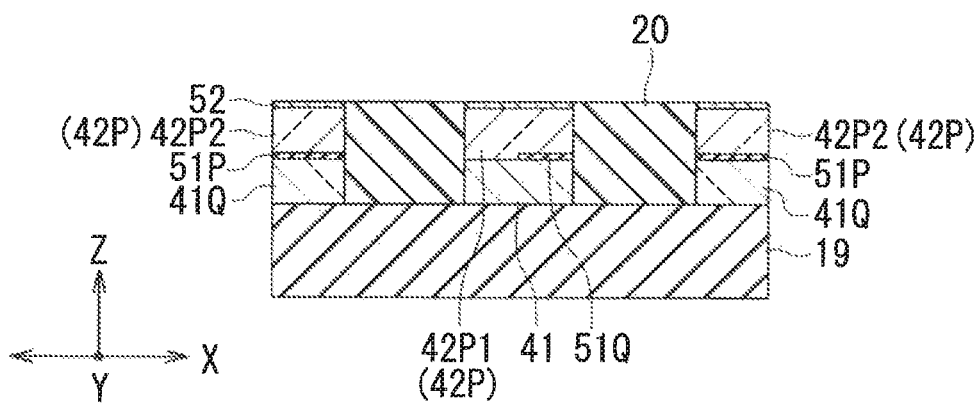
Figure 9C:
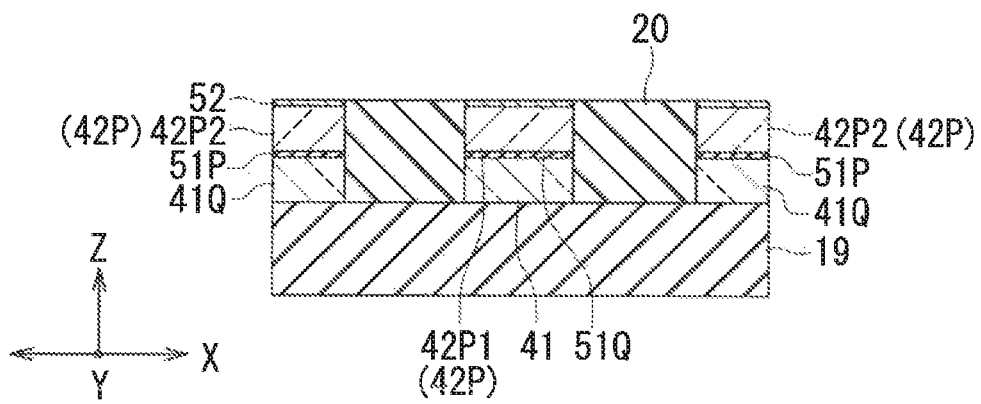

FIGS. 9A to 9C show the next step. In this step, first, the cladding layer 20 is formed over the entire top surface of the layered structure. The cladding layer 20 is then polished by, for example, CMP. The first nonmagnetic metal layer 52 functions as a polishing stopper layer at which the polishing is to be stopped.

Figure 10A:
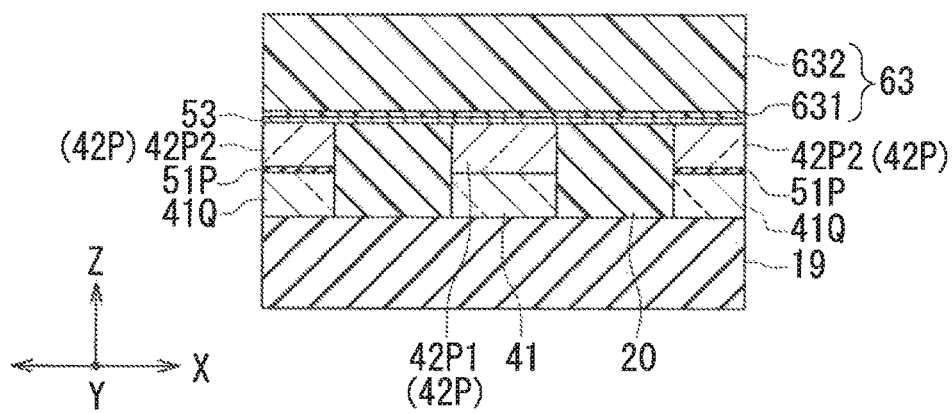
FIGS. 10A to 10C are cross-sectional views showing a step that follows the step shown in FIGS. 9A to 9C.
Figure 10B:
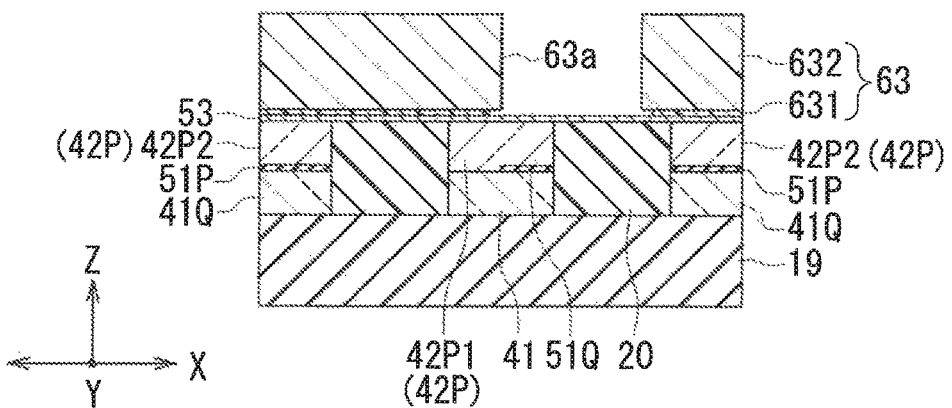
Figure 10C:
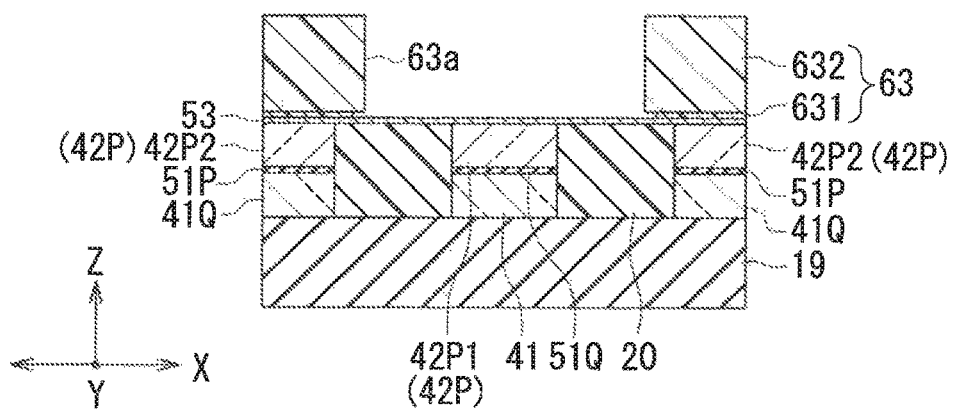

FIGS. 10A to 10C show the next step. In this step, first, the first nonmagnetic metal layer 52 is removed by etching. The etching is performed by IBE or RIE, for example. For RIE, a condition that provides a high ratio of the etching rate of the first nonmagnetic metal layer 52 to the etching rate of the initial second layer 42P is selected. In the example shown in FIGS. 10A to 10C, part of the cladding layer 20 is also etched. Next, a second nonmagnetic metal layer 53 of a nonmagnetic metal material such as Ru is formed on the portions 42P1 and 42P2 of the initial second layer 42P and the cladding layer 20.

Next, an etching mask 63 is formed on the second nonmagnetic metal layer 53. The etching mask 63 has an undercut. The etching mask 63 includes, for example, a lower layer 631 lying on the second nonmagnetic metal layer 53 and an upper layer 632 lying on the lower layer 631. The lower layer 631 and the upper layer 632 are formed of the same materials as those of the lower layer 611 and the upper layer 612, respectively.

The etching mask 63 is formed to cover a portion of the top surface of the layered structure above the top surface 42b of the second layer 42 of the core 40 to be formed later, and not to cover a portion of the top surface of the layered structure above the etching stopper layer 51Q. The etching mask 63 has a wall face 63a which defines the position of the side surface 42e2 (see FIG. 1) of the width-changing portion 42B of the second layer 42.

Figure 11A:
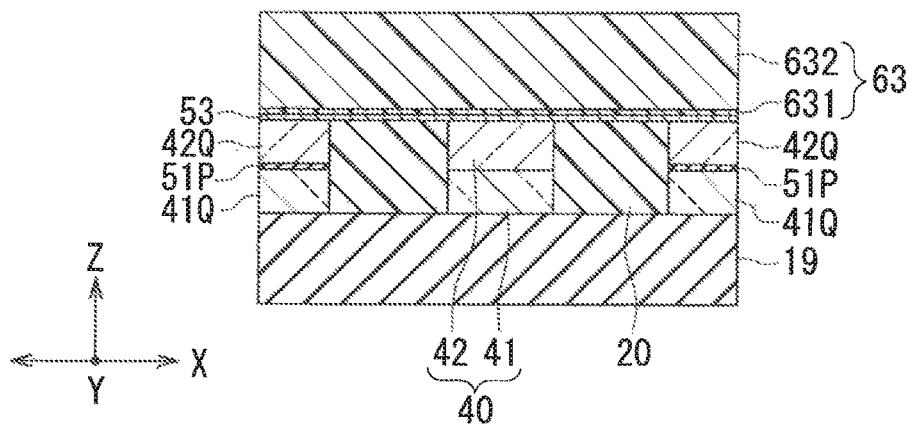
FIGS. 11A to 11C are cross-sectional views showing a step that follows the step shown in FIGS. 10A to 10C.
Figure 11B:
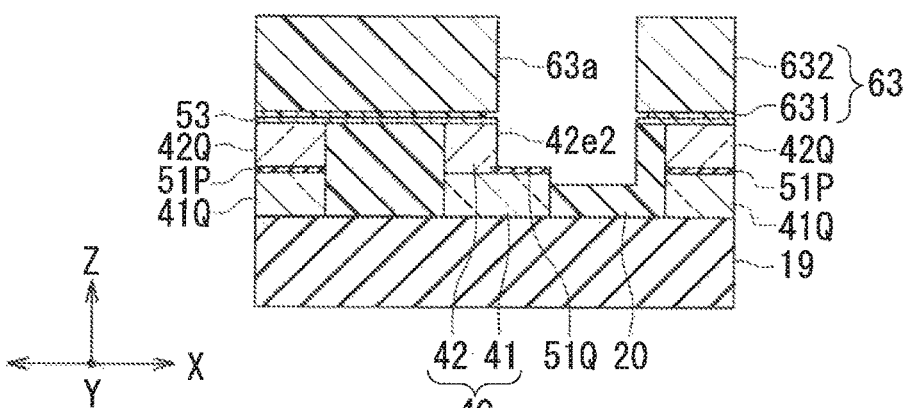
Figure 11C:
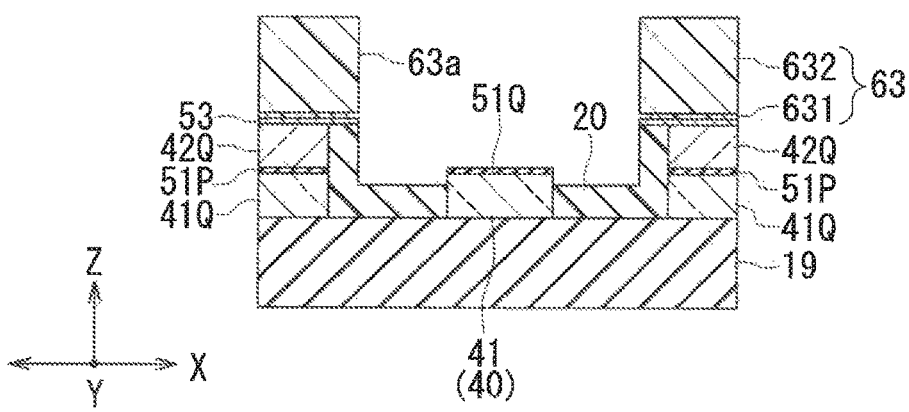

FIGS. 11A to 11C show the next step. In this step, first, a portion of the second nonmagnetic metal layer 53 that is not covered with the etching mask 63 is removed by, for example, IBE. Then, performed is a second etching step of etching the portion 42P1 of the initial second layer 42P using the etching mask 63 until the etching stopper layer 51Q is exposed, so as to make the portion 42P1 of the initial second layer 42P into the second layer 42P. The second etching step is performed by RIE. When alumina is employed as the material of the dielectric layer 51, a gas containing $CF_4$ is used as the etching gas for the second etching step. When magnesium oxide or cerium oxide is employed as the material of the dielectric layer 51, a gas containing $Cl_2$ and $BCl_3$ is used as the etching gas for the second etching step. Part of the cladding layer 20 is also etched in the second etching step. Then, the etching mask 63 is removed.

The second etching step provides the portion 42P1 of the initial second layer 42P with the side surface 42e2 of the width-changing portion 42B of the second layer 42, thereby making the portion 42P1 of the initial second layer 42P into the second layer 42. The core 40 is thereby completed.

As shown in FIGS. 11A to 11C, the portions 42P2 of the initial second layer 42P remain under the etching mask 63. These portions will be referred to as remaining portions and denoted by the symbol 42Q. The distance between the core 40 and the remaining portions 41Q and 42Q may be greater than that shown in FIGS. 11A to 11C. Note that FIG. 4 omits the illustrations of the remaining portions 41Q and 42Q.

At least part of the etching stopper layer 51Q may be removed after the second etching step. Here, an example in which the etching stopper layer 51Q is not removed is shown. In this case, the etching stopper layer 51Q becomes the dielectric layer 51. An example in which at least part of the etching stopper layer 51Q is removed will be described later as a modification example.

Figure 12A:
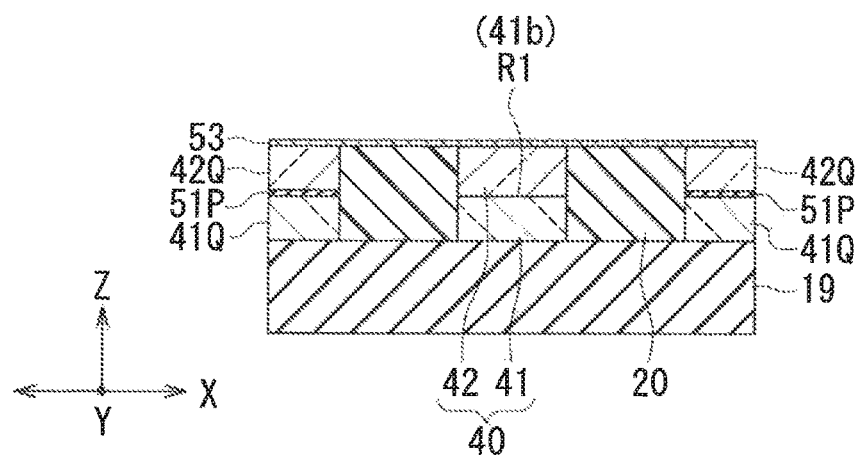
FIGS. 12A to 12C are cross-sectional views showing a step that follows the step shown in FIGS. 11A to 11C.
Figure 12B:
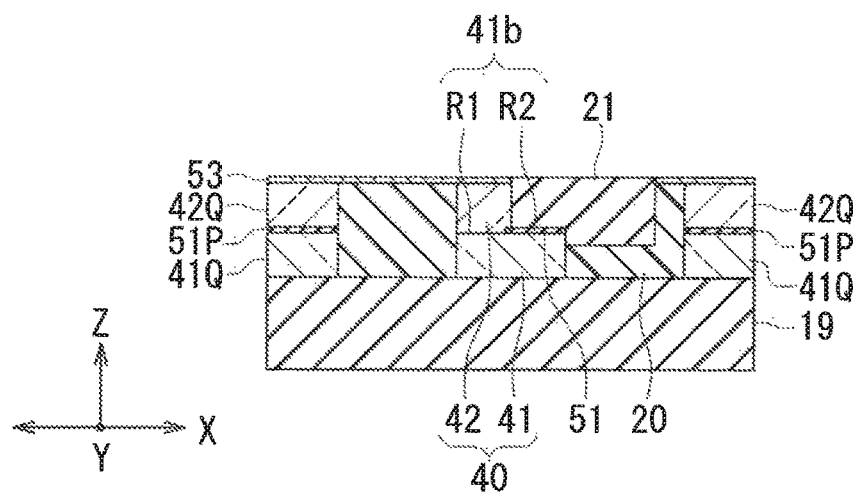
Figure 12C:
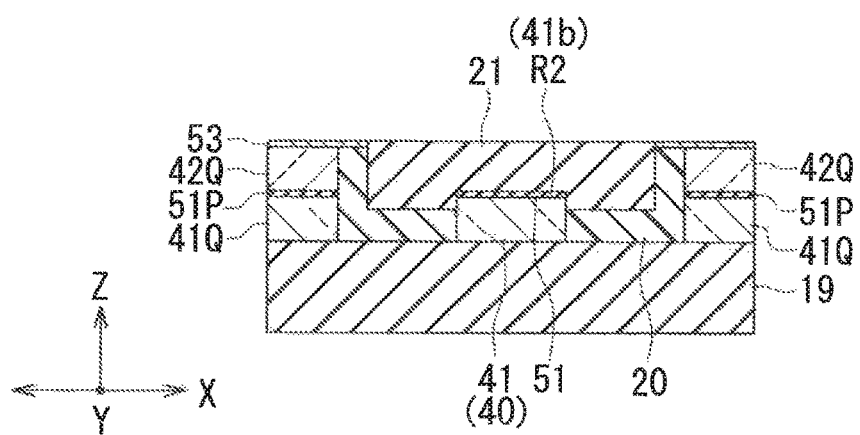

FIGS. 12A to 12C show the next step. In this step, first, the cladding layer 21 is formed over the entire top surface of the layered structure. The cladding layer 21 is then polished by, for example, CMP. The second nonmagnetic metal layer 53 functions as a polishing stopper layer at which the polishing is to be stopped. Next, the second nonmagnetic metal layer 53 is removed by etching. The etching is performed by IBE or RIE, for example. For RIE, a condition that provides a high ratio of the etching rate of the second nonmagnetic metal layer 53 to the etching rate of the second layer 42 is selected. Next, the cladding layers 20 and 21 are selectively etched to form therein openings for exposing the top surfaces of the second layers of the coupling sections 13A and 13B (see FIG. 3). The third layers of the coupling sections 13A and 13B are then formed on the second layers of the coupling sections 13A and 13B. Next, the cladding layer 22 is formed over the entire top surface of the layered structure. The waveguide is thereby completed.

Steps to follow the formation of the cladding layer 22 will now be described with reference to FIG. 3 and FIG. 4. First, the plasmon generator 23 is formed on the cladding layer 22. Next, the dielectric layer 24 is formed to cover the plasmon generator 23. The dielectric layer 24 is then polished by, for example, CMP, until the plasmon generator 23 is exposed. Then, the dielectric layer 25 is formed on the dielectric layer 24 and part of the plasmon generator 23. The dielectric layer 26 is then formed on the plasmon generator 23 and the dielectric layer 25.

Next, the cladding layer 22 and the dielectric layers 24 to 26 are selectively etched to form therein openings for exposing the top surfaces of the third layers of the coupling sections 13A and 13B. Then, the main pole 27 is formed on the dielectric layer 26, and the fourth layers of the coupling sections 13A and 13B are formed on the third layers of the coupling sections 13A and 13B. The dielectric layer 28 is then formed to cover the main pole 27 and the fourth layers of the coupling sections 13A and 13B. The dielectric layer 28 is then polished by, for example, CMP, until the main pole 27 and the fourth layers of the coupling sections 13A and 13B are exposed.

Next, the coil 29 is formed on the dielectric layer 28. Then, the insulating layer 30 is formed to cover the coil 29. The yoke layer 31 is then formed over the main pole 27, the fourth layers of the coupling sections 13A and 13B, the dielectric layer 28 and the insulating layer 30. The protective layer 32 is then formed to cover the yoke layer 31. Wiring, terminals, and other components are then formed on the top surface of the protective layer 32. When the substructure is completed thus, the step of forming the medium facing surface 80a and the rear surface 80b is performed. A protective film for covering the medium facing surface 80a may be formed thereafter. As a result of the formation of the medium facing surface 80a and the rear surface 80b, each pre-slider portion becomes a slider 100.

The step of forming the medium facing surface 80a and the rear surface 80b includes the steps of: polishing two surfaces of each pre-slider portion resulting from cutting the substructure; and forming a rail for allowing the slider to fly on one of the two polished surfaces that becomes the medium facing surface 80a.

Figure 13A:
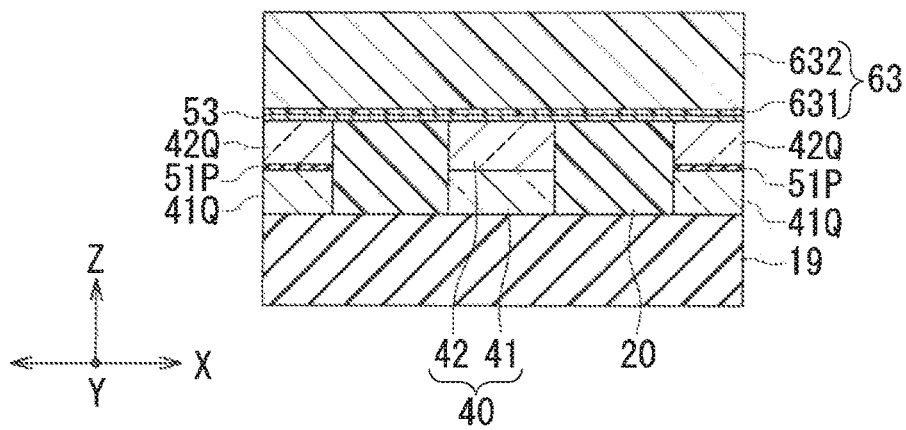
FIGS. 13A to 13C are cross-sectional views showing a step of a manufacturing method for a waveguide of a modification example of the first embodiment of the invention.
Figure 13B:
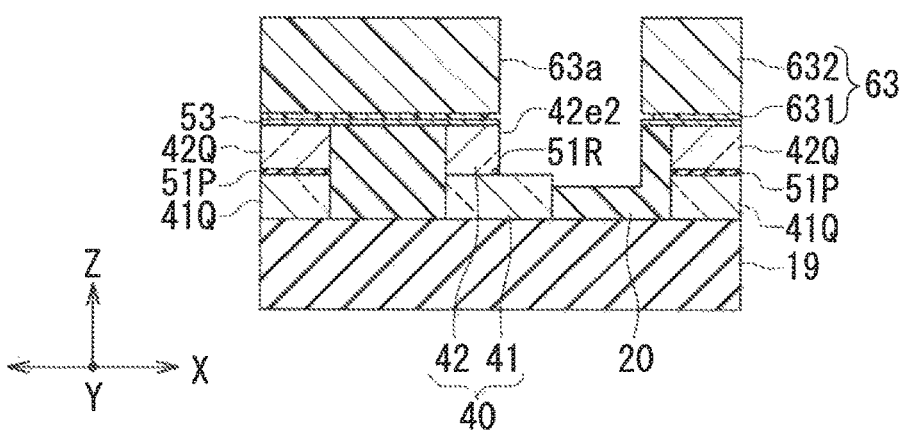
Figure 13C:
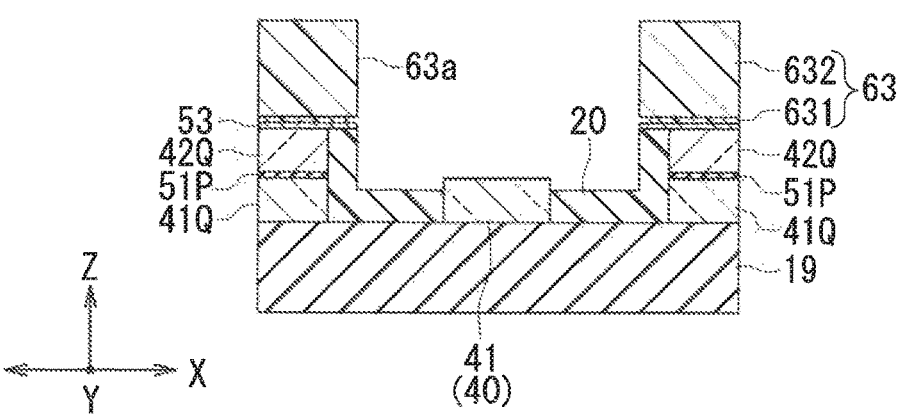
Figure 14A:
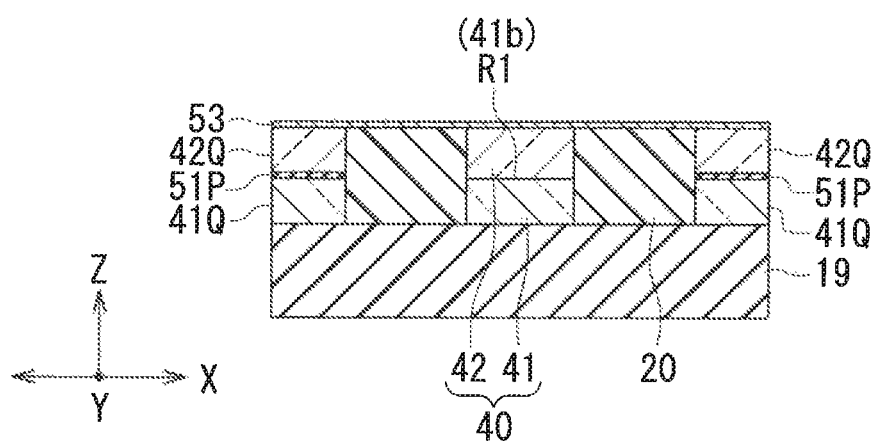
FIGS. 14A to 14C are cross-sectional views showing a step that follows the step shown in FIGS. 13A to 13C.
Figure 14B:
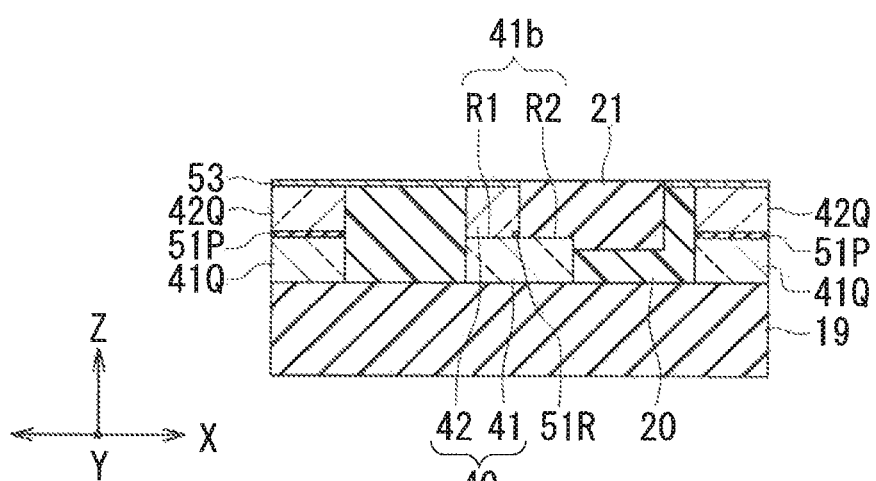
Figure 14C:
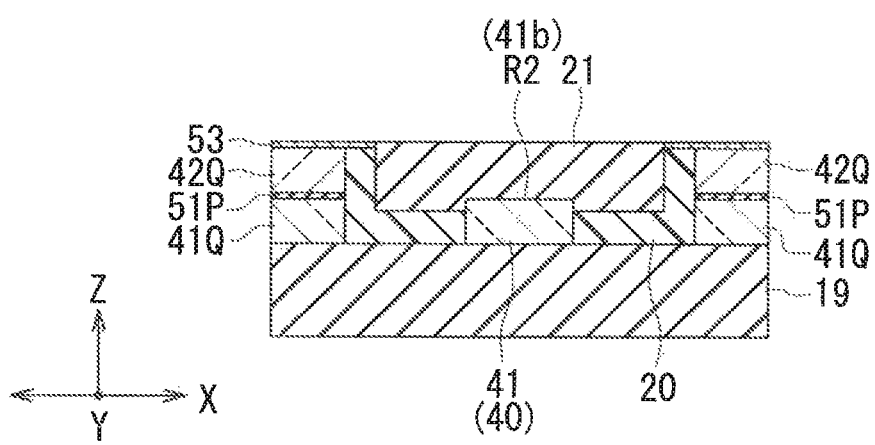

Reference is now made to FIG. 13A to FIG. 14C to describe a manufacturing method for a waveguide of a modification example of the present embodiment. FIG. 13A to FIG. 14C each illustrate a cross section of a layered structure formed in the process of manufacturing the waveguide of the modification example, the cross section being perpendicular to the Y direction. FIGS. 13A and 14A each show a cross section taken at the same location as Fig. nA (n is an integer between 5 and 12 inclusive). FIGS. 13B and 14B each show a cross section taken at the same location as FIG. nB. FIGS. 13C and 14C each show a cross section taken at the same location as FIG. nC.

The manufacturing method for the waveguide of the modification example is the same as the manufacturing method for the waveguide according to the present embodiment up to the second etching step. FIGS. 13A to 13C illustrate the next step. In this step, first, at least part of the etching stopper layer 51Q is removed by etching. Where the dielectric layer 51P including the etching stopper layer 51Q is made of alumina, IBE or wet etching is employed to remove the at least part of the etching stopper layer 51Q.

In the step of removing at least part of the etching stopper layer 51Q, the etching stopper layer 51Q is preferably removed entirely. However, as shown in FIG. 13B, a minute portion of the etching stopper layer 51Q that is located at and near an end thereof and has got caught between the first layer 41 and the second layer 42 may remain. This portion will be referred to as remnant 51R. In the case where the remnant 51R is present, the remnant 51R comes into contact with the second region R2, not the first region R1, of the top surface 41b of the first layer 41.

In the manufacturing method for the waveguide of the modification example, the etching mask 63 is then removed.

FIGS. 14A to 14C show the next step. In this step, first, the cladding layer 21 is formed over the entire top surface of the layered structure. The cladding layer 21 is then polished by, for example, CMP. The subsequent steps are the same as those of the manufacturing method for the waveguide according to the present embodiment.

As has been described, the manufacturing method for the waveguide according to the present embodiment includes the step of forming the core 40 and the step of forming the cladding layers 19 to 22. In the step of forming the core 40, the etching stopper layer 51Q is formed on the second region R2 of the top surface of the initial first layer 41P, and the initial second layer 42P is formed on the initial first layer 41P and the etching stopper layer 51Q. In the step of forming the core 40, the first etching step is then performed to etch the initial second layer 42P and the initial first layer 41P so as to make the initial first layer 41P into the first layer 41, and the second etching step is performed to etch the portion 42P1 of the initial second layer 42P until the etching stopper layer 51Q is exposed, so as to make the portion 42P1 of the initial second layer 42P into the second layer 42.

The present embodiment provides enhanced precision of the shapes of the first layer 41 and the second layer 42. This advantageous effect will now be described below in comparison with manufacturing methods for waveguides of first and second comparative examples.

First, the waveguide of the first comparative example will be described. The waveguide of the first comparative example includes a core 140 formed of the first dielectric material, instead of the core 40 of the present embodiment. The core 140 includes a first portion 141 and a second portion 142. The shape and location of the first portion 141 are the same as those of the first layer 41 of the present embodiment, and the shape and location of the second portion 142 are the same as those of the second layer 42 of the present embodiment. As will be described later, the first portion 141 and the second portion 142 are not composed of two different layers, but are different portions of a single layer. The waveguide of the first comparative example is otherwise configured in the same manner as the waveguide according to the present embodiment.

Next, the manufacturing method for the waveguide of the first comparative example will be described. FIG. 15A to FIG. 19C each illustrate a cross section of a layered structure formed in the process of manufacturing the waveguide of the first comparative example, the cross section being perpendicular to the Y direction. Fig. nA (n is an integer between 15 and 19 inclusive) shows a cross section taken at the same location as Fig. mA (m is an integer between 5 and 12 inclusive). FIG. nB shows a cross section taken at the same location as FIG. mB. FIG. nC shows a cross section taken at the same location as FIG. mC.

Figure 15A:
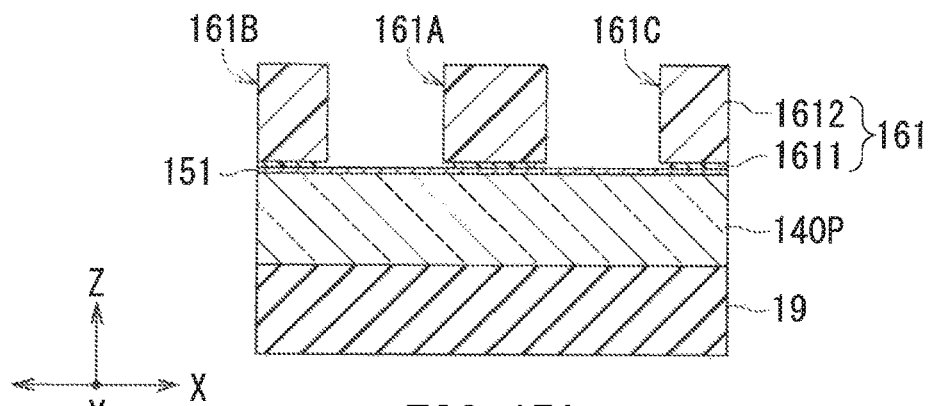
FIGS. 15A to 15C are cross-sectional views showing a step of a manufacturing method for a waveguide of a first comparative example.
Figure 15B:
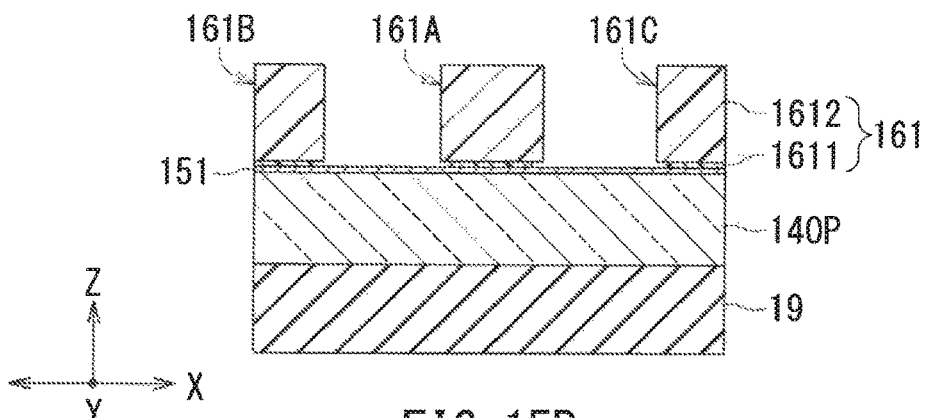
Figure 15C:
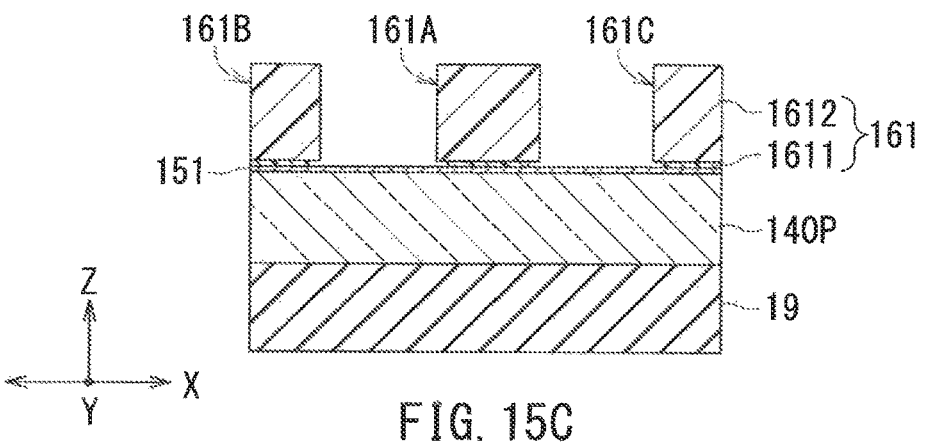

Here, the step of fabricating a slider including the waveguide of the first comparative example will be described. This step is the same as the step of fabricating the slider 100 of the present embodiment up to the step of polishing the cladding layer 19. FIGS. 15A to 15C illustrate the step to follow the polishing of the cladding layer 19. In this step, an initial core 140P is first formed, using the first dielectric material, on the cladding layer 19. The thickness (the dimension in the Z direction) of the initial core 140P falls within the range of 100 to 600 nm, for example. Next, a first nonmagnetic metal layer 151 of a nonmagnetic metal material such as Ru is formed on the initial core 140P. The thickness (the dimension in the Z direction) of the first nonmagnetic metal layer 151 falls within the range of 5 to 50 nm, for example.

Next, an etching mask 161 is formed on the first nonmagnetic metal layer 151. The etching mask 161 has an undercut. The etching mask 161 includes, for example, a lower layer 1611 lying on the first nonmagnetic metal layer 151 and an upper layer 1612 lying on the lower layer 1611. The lower layer 1611 and the upper layer 1612 are formed of the same materials as those of the lower layer 611 and the upper layer 612, respectively. The etching mask 161 includes a first portion 161A, a second portion 161B, and a third portion 161C, the second and third portions 161B and 161C being located on opposite sides of the first portion 161A in the X direction. The planar shape of the first portion 161A corresponds to the planar shape of the first portion 141 of the core 140.

Figure 16A:
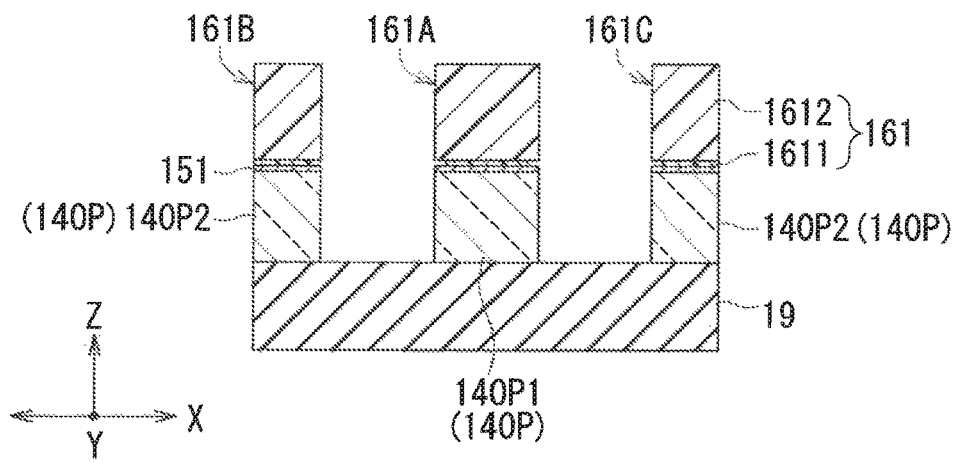
FIGS. 16A to 16C are cross-sectional views showing a step that follows the step shown in FIGS. 15A to 15C.
Figure 16B:
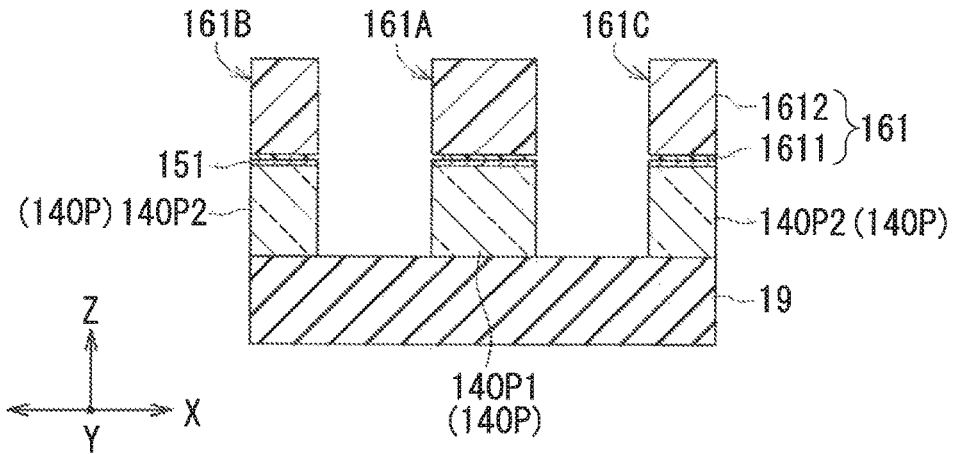
Figure 16C:
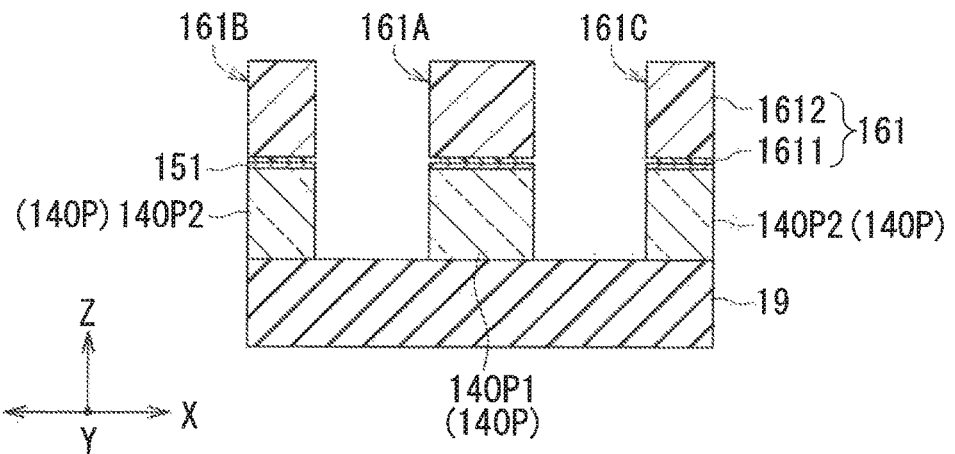

FIGS. 16A to 16C show the next step. In this step, first, a portion of the first nonmagnetic metal layer 151 that is not covered with the etching mask 161 is removed by, for example, IBE. Then, the initial core 140P is etched using the etching mask 161. This etching is performed by RIE and continues until the cladding layer 19 is exposed. This etching divides the initial core 140P into a portion 140P1 under the first portion 161A of the etching mask 161 and portions 140P2 under the second and third portions 161B and 161C of the etching mask 161. The etching mask 161 is then removed.

Figure 17A:
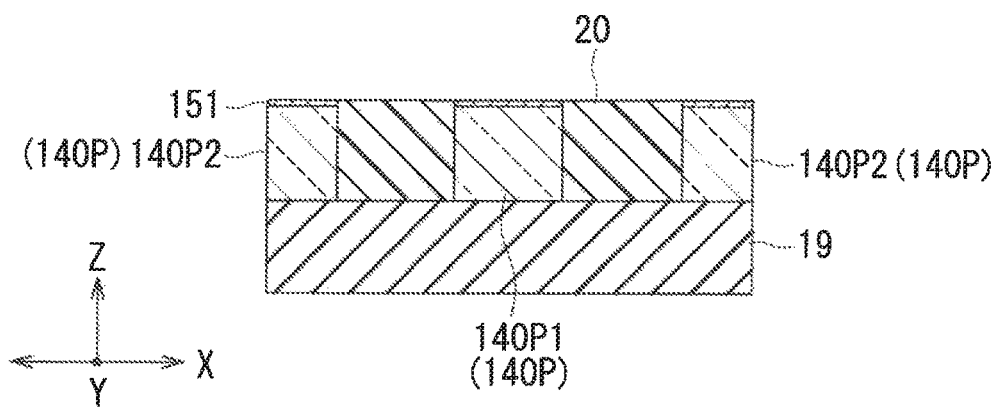
FIGS. 17A to 17C are cross-sectional views showing a step that follows the step shown in FIGS. 16A to 16C.
Figure 17B:
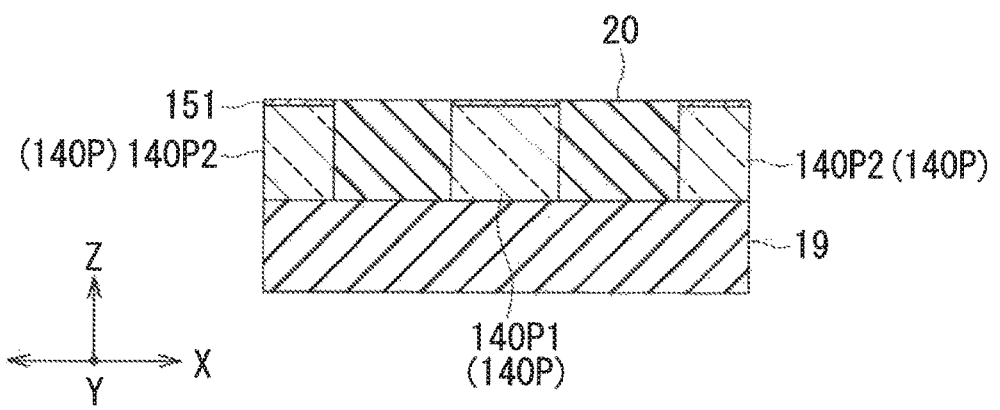
Figure 17C:
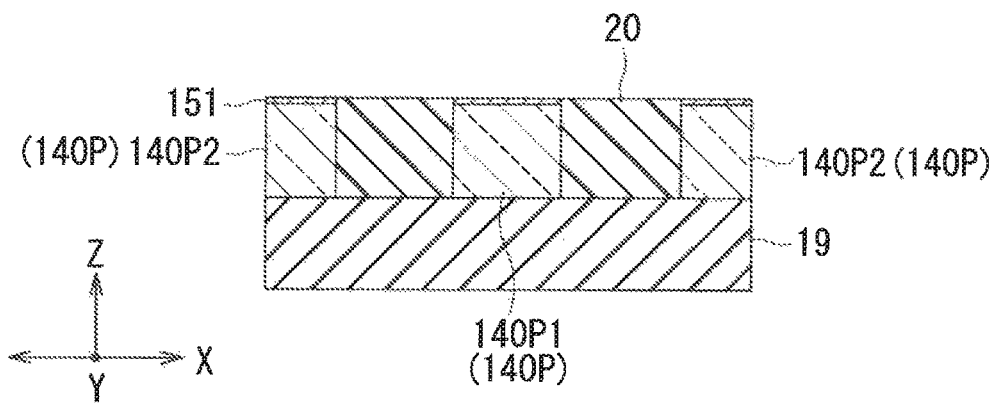

FIGS. 17A to 17C show the next step. In this step, first, the cladding layer 20 is formed over the entire top surface of the layered structure. The cladding layer 20 is then polished by, for example, CMP. The first nonmagnetic metal layer 151 functions as a polishing stopper layer at which the polishing is to be stopped.

Figure 18A:
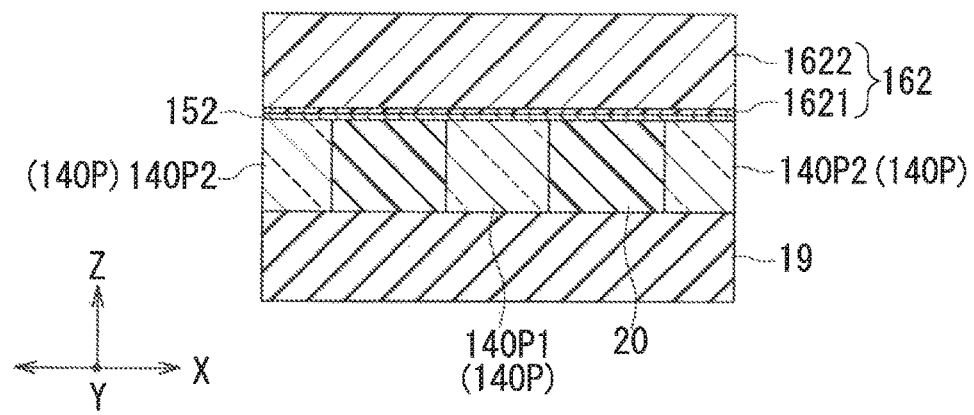
FIGS. 18A to 18C are cross-sectional views showing a step that follows the step shown in FIGS. 17A to 17C.
Figure 18B:
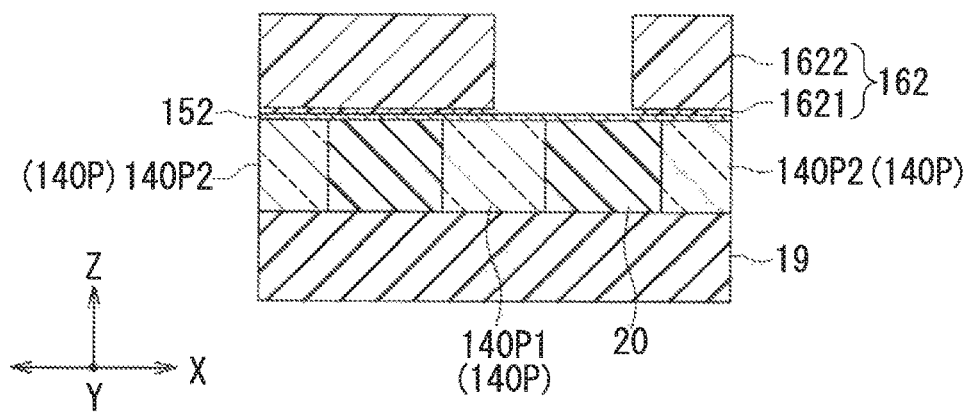
Figure 18C:
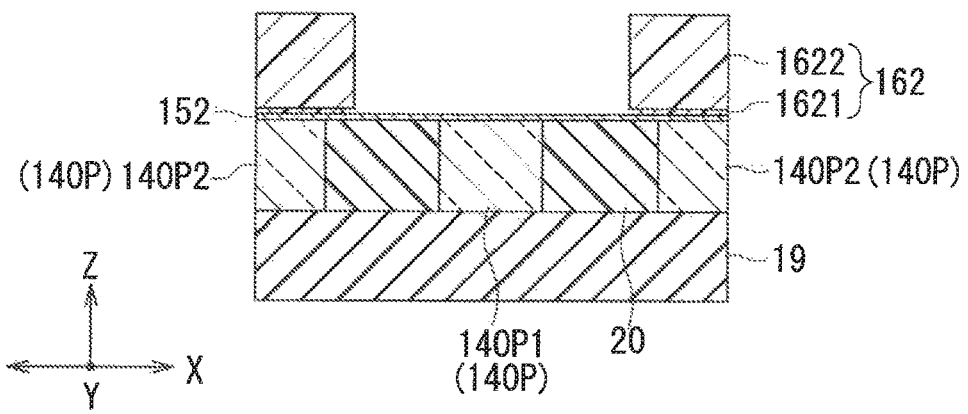

FIGS. 18A to 18C show the next step. In this step, first, the first nonmagnetic metal layer 151 is removed by etching. The etching is performed by IBE or RIE, for example. In the example shown in FIGS. 18A to 18C, part of the cladding layer 20 is also etched. Next, a second nonmagnetic metal layer 152 of a nonmagnetic metal material such as Ru is formed on the portions 140P1 and 140P2 of the initial core 140P and the cladding layer 20.

Next, an etching mask 162 is formed on the second nonmagnetic metal layer 152. The etching mask 162 has an undercut. The etching mask 162 includes, for example, a lower layer 1621 lying on the second nonmagnetic metal layer 152 and an upper layer 1622 lying on the lower layer 1621. The lower layer 1621 and the upper layer 1622 are formed of the same materials as those of the lower layer 611 and the upper layer 612, respectively. The planar shape of the etching mask 162 is the same as that of the etching mask 63 of the present embodiment.

Figure 19A:
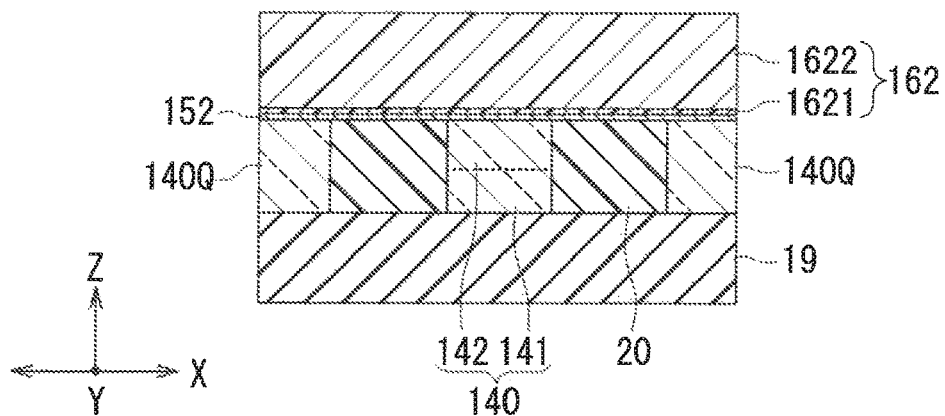
FIGS. 19A to 19C are cross-sectional views showing a step that follows the step shown in FIGS. 18A to 18C.
Figure 19B:
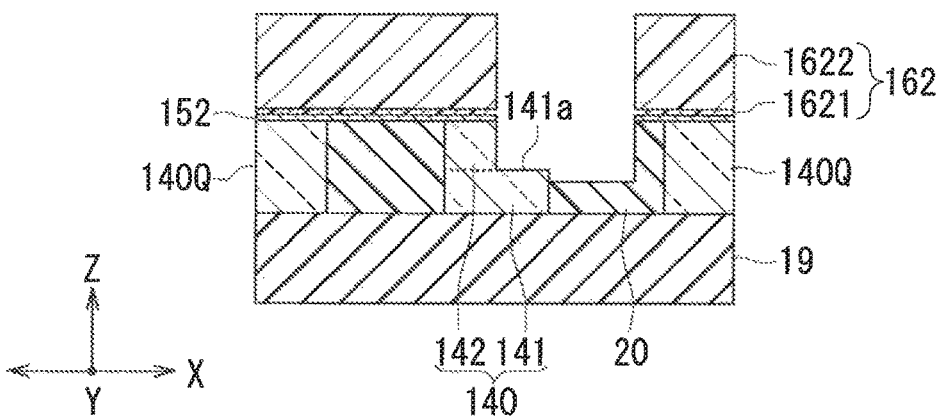
Figure 19C:
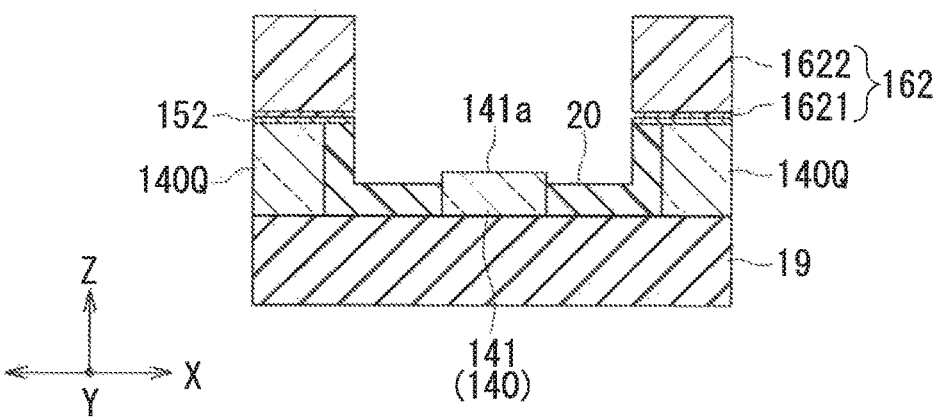

FIGS. 19A to 19C show the next step. In this step, first, a portion of the second nonmagnetic metal layer 152 that is not covered with the etching mask 162 is removed by, for example, IBE. Then, the portion 140P1 of the initial core 140 and the cladding layer 20 are etched using the etching mask 162 to as to make the portion 140P1 of the initial core 140P into the core 140. This etching is performed by RIE. This etching provides the portion 140P1 of the initial core 140P with the top surface 141a of the first portion 141, thereby completing the core 140. In FIGS. 19A and 19B the boundary between the first portion 141 and the second portion 142 is indicated by a dotted line.

As shown in FIGS. 19A to 19C, the portions 140P2 of the initial core 140P remain under the etching mask 162. These portions will be referred to as remaining portions and denoted by the symbol 140Q.

In the step of fabricating the slider including the waveguide of the first comparative example, the etching mask 162 is then removed. Next, the cladding layer 21 (see FIG. 3) is formed over the entire top surface of the layered structure. The cladding layer 21 is then polished by, for example, CMP. The second nonmagnetic metal layer 152 functions as a polishing stopper layer at which the polishing is to be stopped. Next, the second nonmagnetic metal layer 152 is removed by etching. The etching is performed by IBE or RIE, for example. Next, the cladding layers 20 and 21 are selectively etched to form therein openings for exposing the top surfaces of the second layers of the coupling sections 13A and 13B (see FIG. 3). The subsequent steps are the same as those of the step of fabricating the slider 100 of the present embodiment.

In the manufacturing method for the waveguide of the first comparative example, the top surface 141a of the first portion 141 is formed by etching. The level of the top surface 141a is controlled by the etching duration, for example. However, as with the step of fabricating the slider 100 of the present embodiment, in the case of forming a plurality of waveguides on a single wafer, it is difficult to perform control to obtain uniform etching amounts over the entire surface of the wafer, and it is thus difficult to control the levels of individual top surfaces 141a with precision. Accordingly, the first comparative example has a disadvantage that there may occur variations in the level of the top surface 141a, resulting in variations in the thicknesses of the first portion 141 and the second portion 142.

According to the present embodiment, in contrast, the first layer 41 is formed through a series of steps from the step of FIGS. 5A-5C to the step of FIGS. 8A-8C. In the foregoing series of steps, the top surface of a portion of the initial first layer 41P that is to become the first layer 41, that is, the top surface 41b of the first layer 41, is covered with the initial second layer 42P and the etching stopper layer 51Q. Thus, no variation in the level of the top surface of the foregoing portion of the initial first layer 41P is caused by etching. The present embodiment thus enables more precise control of the levels of the top surfaces 41b of the individual first layers 41, thereby reducing thickness variations of the first layers 41 when compared with the first comparative example.

Further, according to the present embodiment, the second layer 42 is formed through a series of steps from the step of FIGS. 7A-7C to the step of FIGS. 11A-11C. In the foregoing series of steps, the level of the top surface of a portion of the initial second layer 42P that is to become the second layer 42, that is, the level of the top surface 42b of the second layer 42, is hardly varied by etching. The present embodiment thus enables more precise control of the levels of the top surfaces 42b of the individual second layers 42, thereby reducing thickness variations of the second layers 42 when compared with the first comparative example.

By virtue of the foregoing, the present embodiment provides higher precision of the shapes of the first layer 41 and the second layer 42, compared with the first comparative example. The present embodiment thereby prevents the function of the core 40 to rotate the polarization direction of the light propagating therethrough from being affected by variations in the shapes of the first layer 41 and the second layer 42.

Next, the waveguide of the second comparative example will be described. The waveguide of the second comparative example includes a core 240 formed of the first dielectric material and a dielectric layer 251 formed of the third dielectric material, instead of the core 40 and the dielectric layer 51 of the present embodiment. The core 240 includes a first layer 241 and a second layer 242. The shape and location of the first layer 241 are the same as those of the first layer 41 of the present embodiment. The dielectric layer 251 lies over the entire top surface of the first layer 241. The thickness (the dimension in the Z direction) of the dielectric layer 251 is the same as that of the dielectric layer 51 of the present embodiment.

The second layer 242 lies on the dielectric layer 251. The dielectric layer 251 is thus present over the entire region between the first layer 241 and the second layer 242. The second layer 242 has the same shape as that of the second layer 42 of the present embodiment. The waveguide of the second comparative example is otherwise configured in the same manner as the waveguide according to the present embodiment.

Next, the manufacturing method for the waveguide of the second comparative example will be described. FIG. 20A to FIG. 25C each illustrate a cross section of a layered structure formed in the process of manufacturing the waveguide of the second comparative example, the cross section being perpendicular to the Y direction. Fig. nA (n is an integer between 20 and 25 inclusive) shows a cross section taken at the same location as Fig. mA (m is an integer between 5 and 12 inclusive). FIG. nB shows a cross section taken at the same location as FIG. mB. FIG. nC shows a cross section taken at the same location as FIG. mC.

Figure 20A:
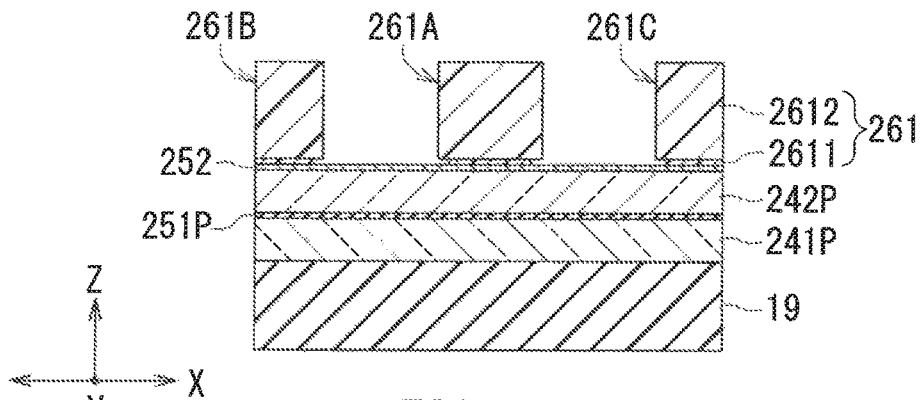
FIGS. 20A to 20C are cross-sectional views showing a step of a manufacturing method for a waveguide of a second comparative example.
Figure 20B:
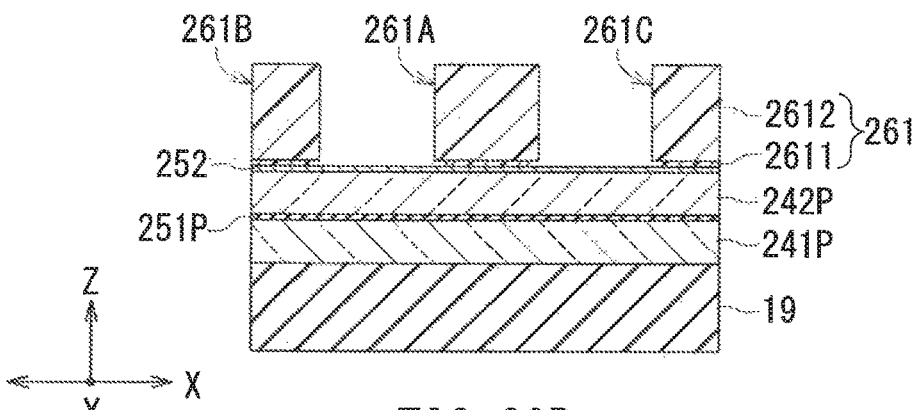
Figure 20C:
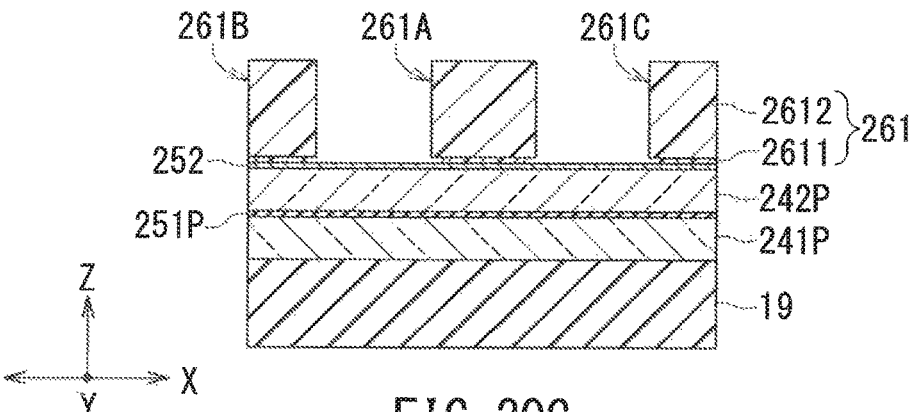

Here, the step of fabricating a slider including the waveguide of the second comparative example will be described. This step is the same as the step of fabricating the slider 100 of the present embodiment up to the step of polishing the cladding layer 19. FIGS. 20A to 20C illustrate the step to follow the polishing of the cladding layer 19. In this step, an initial first layer 241P is first formed, using the first dielectric material, on the cladding layer 19. Then, a dielectric layer 251P is formed on the initial first layer 241P. An initial second layer 242P is then formed, using the first dielectric material, on the dielectric layer 251P. Next, a first nonmagnetic metal layer 252 of a nonmagnetic metal material such as Ru is formed on the initial second layer 242P. The thickness (the dimension in the Z direction) of the first nonmagnetic metal layer 252 is the same as that of the first nonmagnetic metal layer 52 of the present embodiment.

Next, an etching mask 261 is formed on the first nonmagnetic metal layer 252. The etching mask 261 has an undercut. The etching mask 261 includes, for example, a lower layer 2611 lying on the first nonmagnetic metal layer 252 and an upper layer 2612 lying on the lower layer 2611. The lower layer 2611 and the upper layer 2612 are formed of the same materials as those of the lower layer 611 and the upper layer 612, respectively.

The etching mask 261 includes a first portion 261A, a second portion 261B, and a third portion 261C, the second and third portions 261B and 261C being located on opposite sides of the first portion 261A in the X direction. The planar shape of the first portion 261A corresponds to the planar shape of the first layer 241 of the core 240.

Figure 21A:
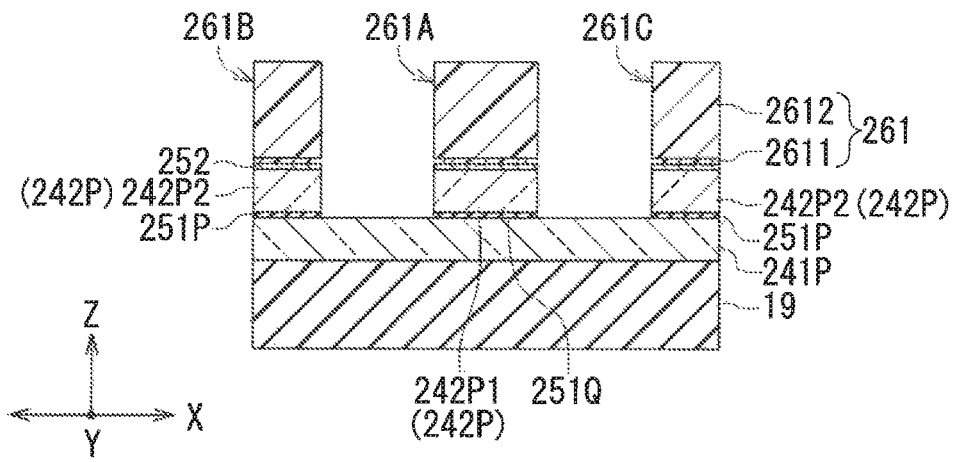
FIGS. 21A to 21C are cross-sectional views showing a step that follows the step shown in FIGS. 20A to 20C.
Figure 21B:
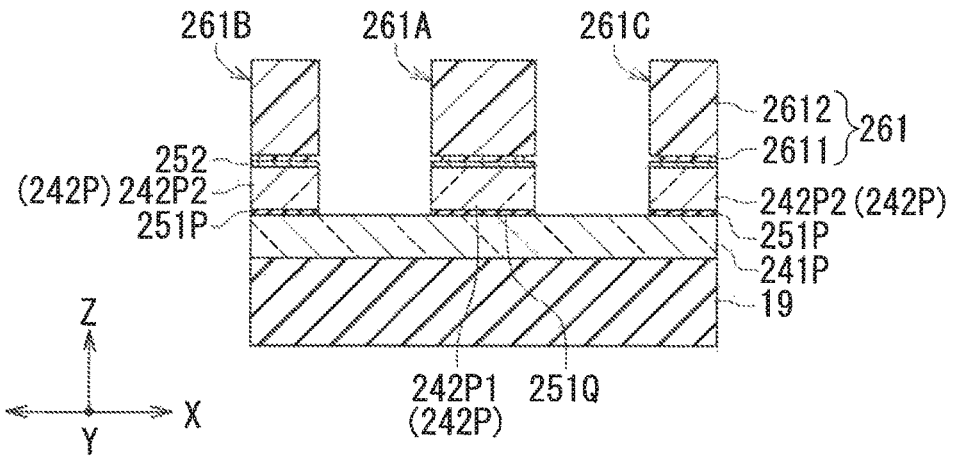
Figure 21C:
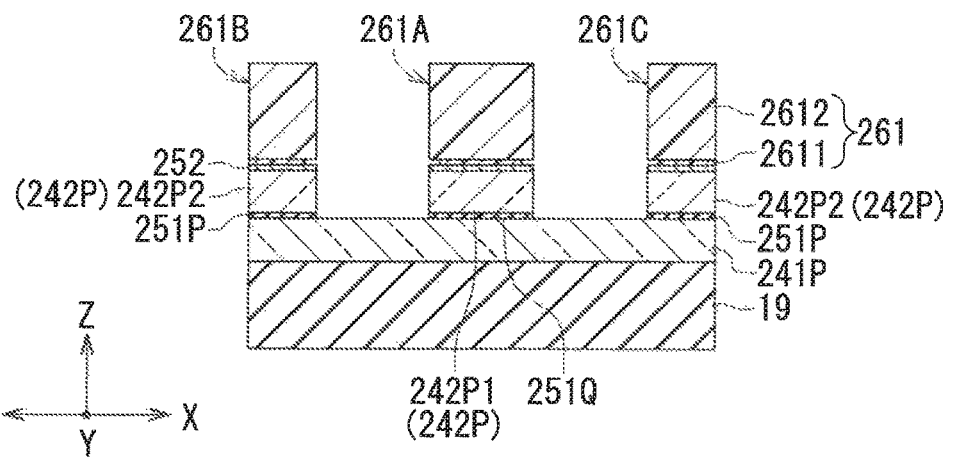

FIGS. 21A to 21C show the next step. In this step, first, a portion of the first nonmagnetic metal layer 252 that is not covered with the etching mask 261 is removed by, for example, IBE. Next, the initial second layer 242P is etched using the etching mask 261 until the dielectric layer 251P is exposed. This etching is performed by RIE. The relation between the material used to form the dielectric layer 251 and the etching gas used in this etching is the same as the relation between the material used to form the dielectric layer 51 and the etching gas used in the second etching step in the present embodiment. This etching divides the initial second layer 242P into a portion 242P1 under the first portion 261A of the etching mask 261 and portions 242P2 under the second and third portions 261B and 261C of the etching mask 261.

Next, a portion of the dielectric layer 251P that is not covered with the etching mask 261 or the initial second layer 242P is removed by IBE. A portion of the remainder of the dielectric layer 251P that is located under the first portion 261A of the etching mask 261 is an etching stopper layer 251Q to be used in a later step. The etching stopper layer 251Q lies over the entire top surface of a portion of the initial first layer 241P that is to become the first layer 241 later.

Figure 22A:
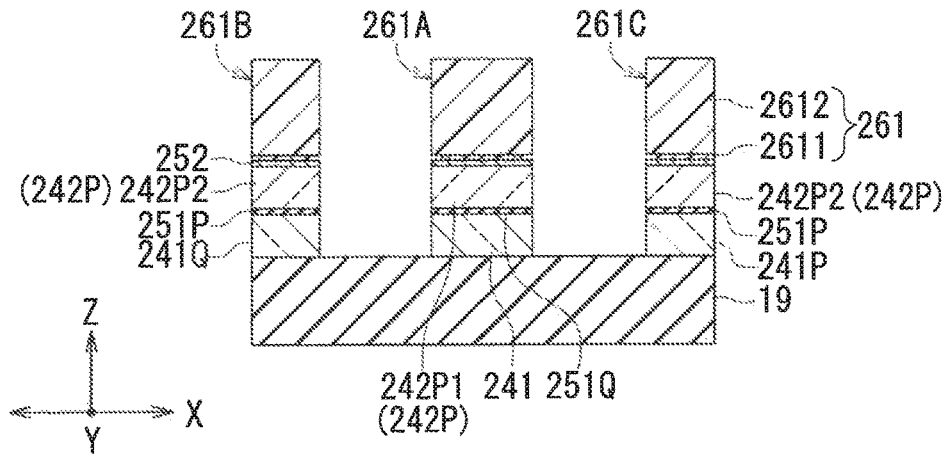
FIGS. 22A to 22C are cross-sectional views showing a step that follows the step shown in FIGS. 21A to 21C.
Figure 22B:
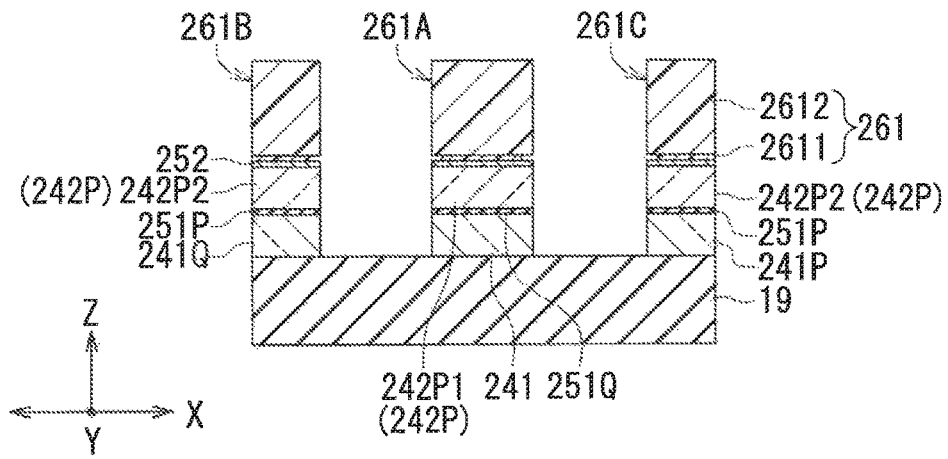
Figure 22C:
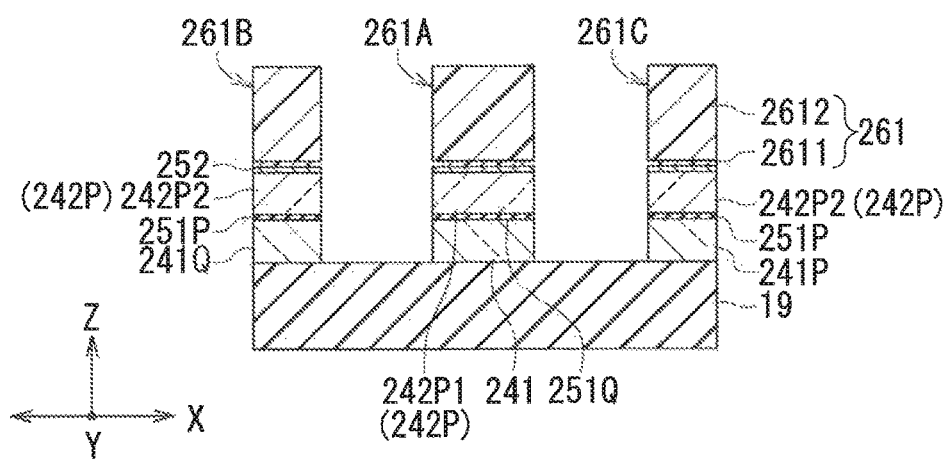

FIGS. 22A to 22C show the next step. In this step, first, the initial first layer 241P is etched using the etching mask 261 so as to make the initial first layer 241P into the first layer 241. This etching is performed by RIE and continues until the cladding layer 19 is exposed. As a result of this etching, a portion of the initial first layer 241P that remains under both of the first portion 261A of the etching mask 261 and the portion 242P1 of the initial second layer 242P makes the first layer 241. As shown in FIGS. 22A to 22C, portions of the initial first layer 241P also remain under the second and third portions 261B and 261C of the etching mask 261 and under the portions 242P2 of the initial second layer 242P. These portions will be referred to as remaining portions and denoted by the symbol 241Q. Next, the etching mask 261 is removed using an etch stripping solution.

Figure 23A:
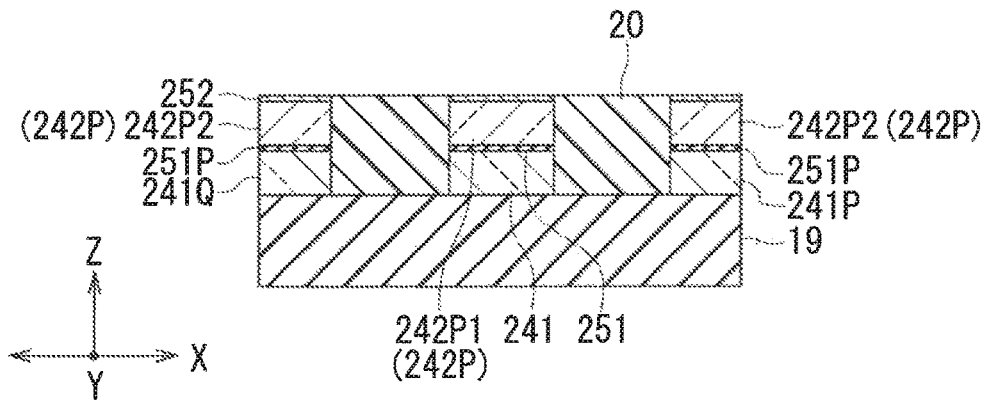
FIGS. 23A to 23C are cross-sectional views showing a step that follows the step shown in FIGS. 22A to 22C.
Figure 23B:
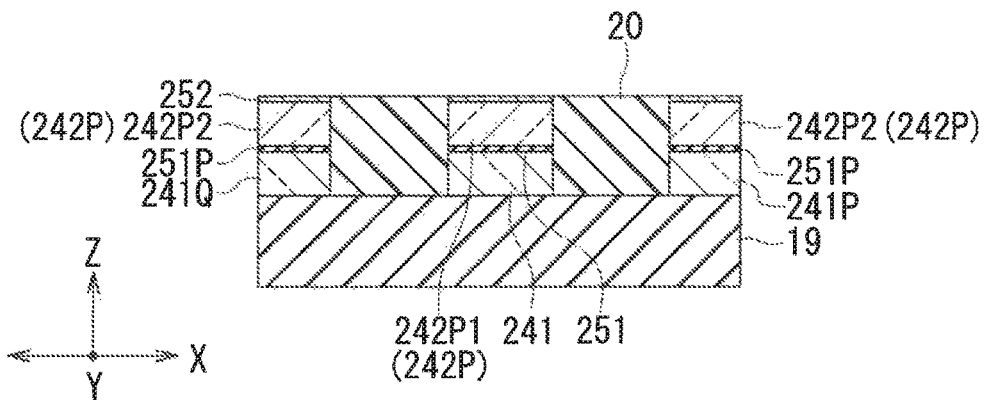
Figure 23C:
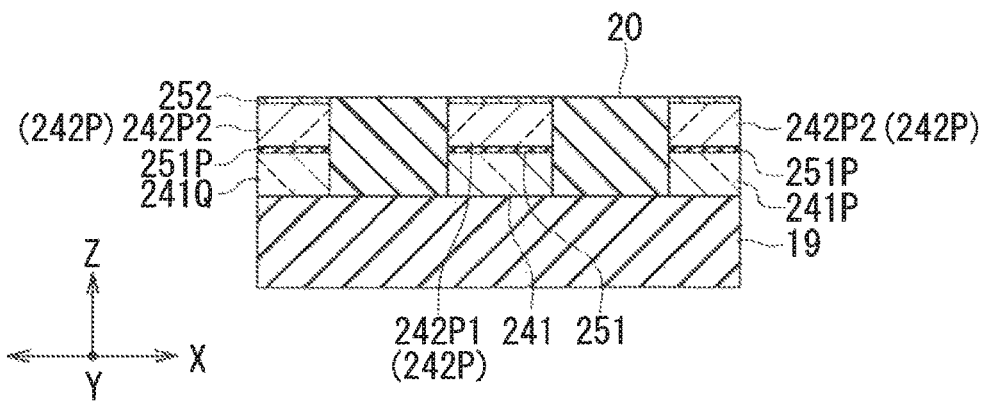

FIGS. 23A to 23C show the next step. In this step, first, the cladding layer 20 is formed over the entire top surface of the layered structure. The cladding layer 20 is then polished by, for example, CMP. The first nonmagnetic metal layer 252 functions as a polishing stopper layer at which the polishing is to be stopped.

Figure 24A:
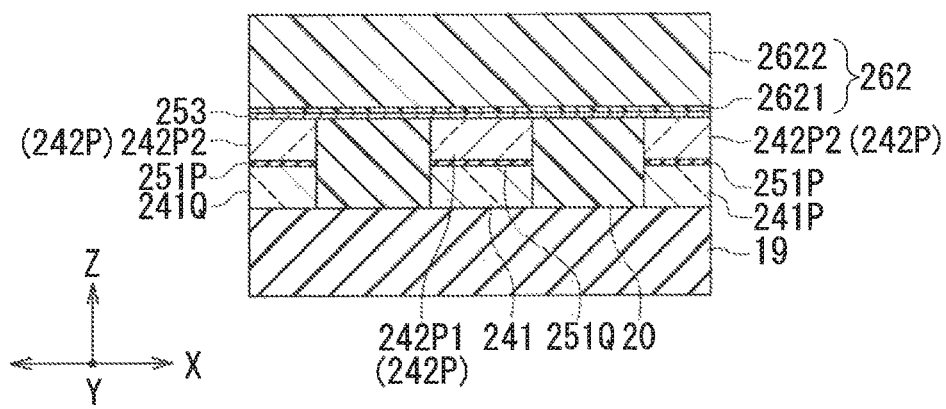
FIGS. 24A to 24C are cross-sectional views showing a step that follows the step shown in FIGS. 23A to 23C.
Figure 24B:
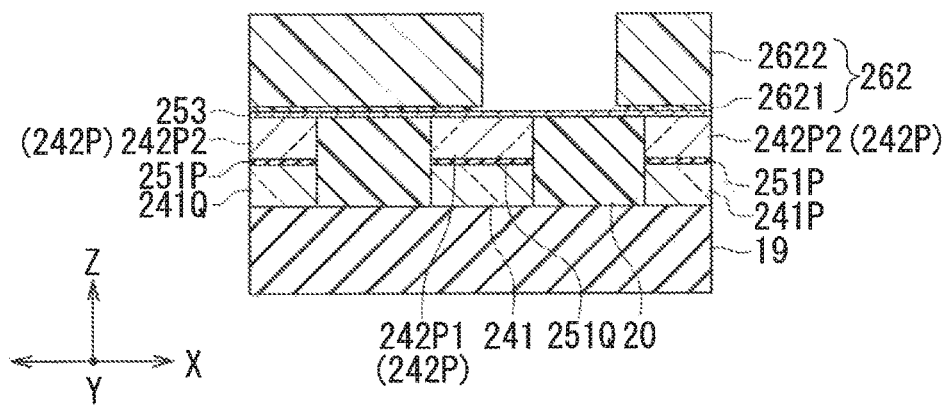
Figure 24C:
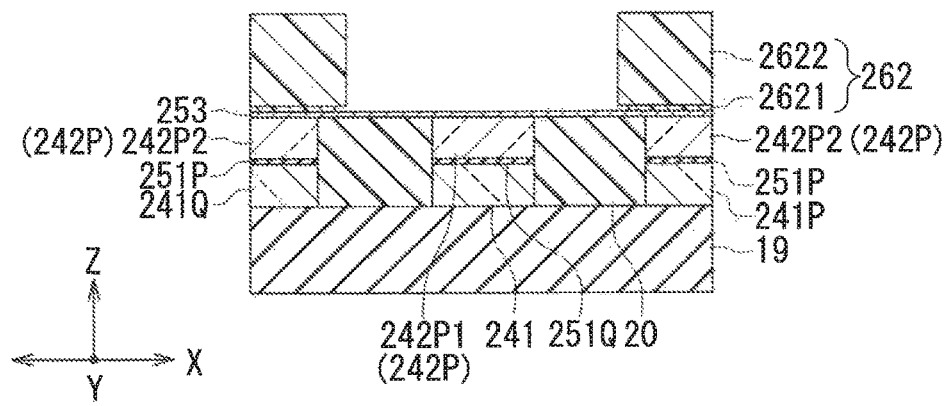

FIGS. 24A to 24C show the next step. In this step, first, the first nonmagnetic metal layer 252 is removed by etching. The etching is performed by IBE or RIE, for example. In the example shown in FIGS. 24A to 24C, part of the cladding layer 20 is also etched. Next, a second nonmagnetic metal layer 253 of a nonmagnetic metal material such as Ru is formed on the portions 242P1 and 242P2 of the initial second layer 242P and the cladding layer 20.

Next, an etching mask 262 is formed on the second nonmagnetic metal layer 253. The etching mask 262 has an undercut. The etching mask 262 includes, for example, a lower layer 2621 lying on the second nonmagnetic metal layer 253 and an upper layer 2622 lying on the lower layer 2621. The lower layer 2621 and the upper layer 2622 are formed of the same materials as those of the lower layer 611 and the upper layer 612, respectively. The planar shape of the etching mask 262 is the same as that of the etching mask 63 of the present embodiment.

Figure 25A:
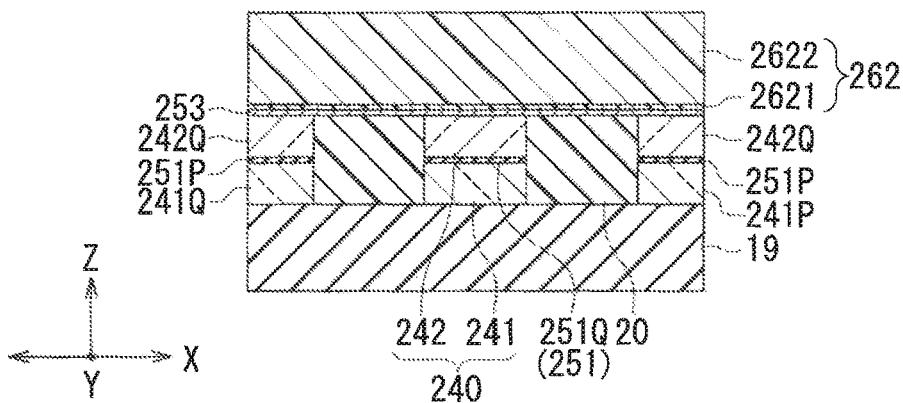
FIGS. 25A to 25C are cross-sectional views showing a step that follows the step shown in FIGS. 24A to 24C.
Figure 25B:
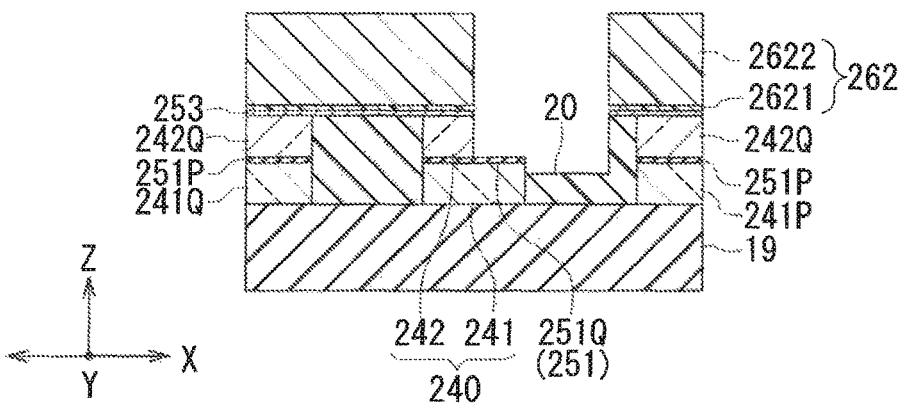
Figure 25C:
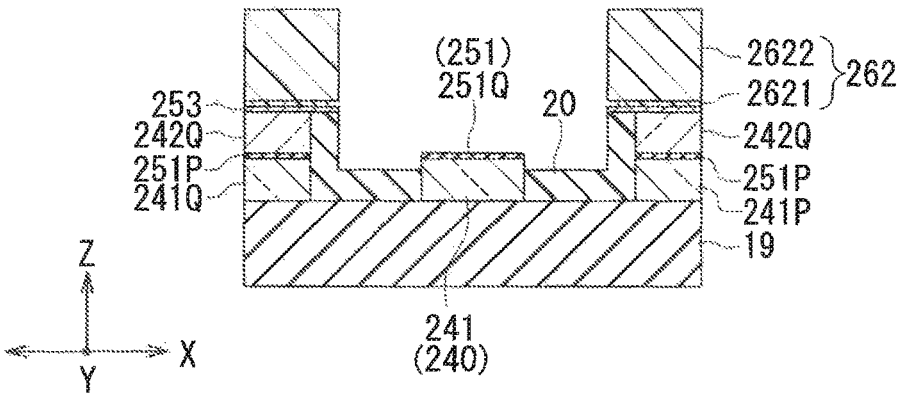

FIGS. 25A to 25C show the next step. In this step, first, a portion of the second nonmagnetic metal layer 253 that is not covered with the etching mask 262 is removed by, for example, IBE. Then, the portion 242P1 of the initial second layer 242P and the cladding layer 20 are etched using the etching mask 262 until the etching stopper layer 251Q is exposed, so as to make the portion 242P1 of the initial second layer 242P into the second layer 242. This etching is performed by RIE. The relation between the material used to form the dielectric layer 251 and the etching gas used in this etching is the same as the relation between the material used to form the dielectric layer 51 and the etching gas used in the second etching step in the present embodiment. This etching makes the portion 242P1 of the initial second layer 242P into the second layer 242, thereby completing the core 240. The etching stopper layer 251Q after the etching becomes the dielectric layer 251.

As shown in FIGS. 25A to 25C, the portions 242P2 of the initial second layer 242P remain under the etching mask 262. These portions will be referred to as remaining portions and denoted by the symbol 242Q.

In the step of fabricating the slider including the waveguide of the second comparative example, the etching mask 262 is then removed. Next, the cladding layer 21 (see FIG. 3) is formed over the entire top surface of the layered structure. The cladding layer 21 is then polished by, for example, CMP. The second nonmagnetic metal layer 253 functions as a polishing stopper layer at which the polishing is to be stopped. Next, the second nonmagnetic metal layer 253 is removed by etching. The etching is performed by IBE or RIE, for example. Next, the cladding layers 20 and 21 are selectively etched to form therein openings for exposing the top surfaces of the second layers of the coupling sections 13A and 13B (see FIG. 3). The subsequent steps are the same as those of the step of fabricating the slider 100 of the present embodiment.

According to the manufacturing method for the waveguide of the second comparative example, the first layer 241 is formed through a series of steps from the step of FIGS. 20A-20C to the step of FIGS. 22A-22C. In the foregoing series of steps, the initial second layer 242P is etched by RIE, and then the dielectric layer 251P is etched by IBE with the etching mask 261 left unremoved. As a result, a first re-deposition film formed on the wall face of the initial second layer 242P during etching of the initial second layer 242P is covered with a second re-deposition film formed during etching of the dielectric layer 251P.

Further, in the foregoing series of steps, the initial first layer 241P is etched by RIE with the etching mask 261 left unremoved. As a result, the first and second re-deposition films are covered with a third re-deposition film formed during etching of the initial first layer 241P. The third re-deposition film resulting from RIE is removed together with the etching mask 261 by an etch stripping solution in the step of removing the etching mask 261 (see FIGS. 22A to 22C) after the step of etching the initial first layer 241P, whereas neither of the second re-deposition film resulting from IBE and the first re-deposition film covered with the second re-deposition film are removed. According to the second comparative example, it is thus difficult to form the second layer 242 with precision.

According to the present embodiment, in contrast, the first layer 41 is formed through a series of steps from the step of FIGS. 5A-5C to the step of FIGS. 8A-8C. In the foregoing series of steps, the initial second layer 24P is formed after the etching of the dielectric layer 51P. In the first etching step (see FIGS. 8A to 8C), the initial second layer 42P and the initial first layer 41P are etched by RIE. The dielectric layer 51P including the etching stopper layer 51Q is not etched in the first etching step. A re-deposition film formed on the wall faces of the initial second layer 42P and the initial first layer 41P (the first layer 41) during the etching of the initial second layer 42P and the initial first layer 41P is removed together with the etching mask 62 by an etch stripping solution in the step of removing the etching mask 62 after the first etching step. The present embodiment thus enables formation of the second layer 42 with higher precision, compared with the second comparative example.

In the waveguide of the second comparative example, the dielectric layer 251 formed of the third dielectric material, which is different from the first dielectric material forming the core 240, is present over the entire region between the first layer 241 and the second layer 242. Accordingly, in the second comparative example, the function of the core 240 to rotate the polarization direction of the light propagating therethrough may be degraded by the dielectric layer 251.

In contrast, the present embodiment allows the first region R1 (see FIG. 1) of the top surface 41b of the first layer 41 and the bottom surface 42a of the second layer 42 to be in contact with each other. Thus, the present embodiment enables preventing the function of the core 40 from being degraded like the second comparative example.

If the etching stopper layer 51Q is not removed in the manufacturing method for the waveguide according to the present embodiment, a portion of the dielectric layer 51 lying outside the first region R1 may sometimes be interposed between the first layer 41 and second layer 42, as shown in FIG. 12B. Even in such a case, when viewed from above, the overlap between the second layer 42 and the dielectric layer 51 is small in area, and the top surface 41b of the first layer 41 and the bottom surface 42b of the second layer 42 are in contact with each other throughout most of the region where the second layer 42 and the first layer 41 overlap each other. In this case, unlike the second comparative example, the dielectric layer 51 induces no degradation in the function of the core 40.

According to the manufacturing method for the waveguide of the modification example, as shown in FIG. 14B, the remnant 51R lying outside the first region R1 may sometimes be interposed between the first layer 41 and the second layer 42. Even in such a case, there occurs no degradation in the function of the core 40 because of the same reason as that for the foregoing case in which the etching stopper layer 51Q is not removed.

Second Embodiment

Figure 26:
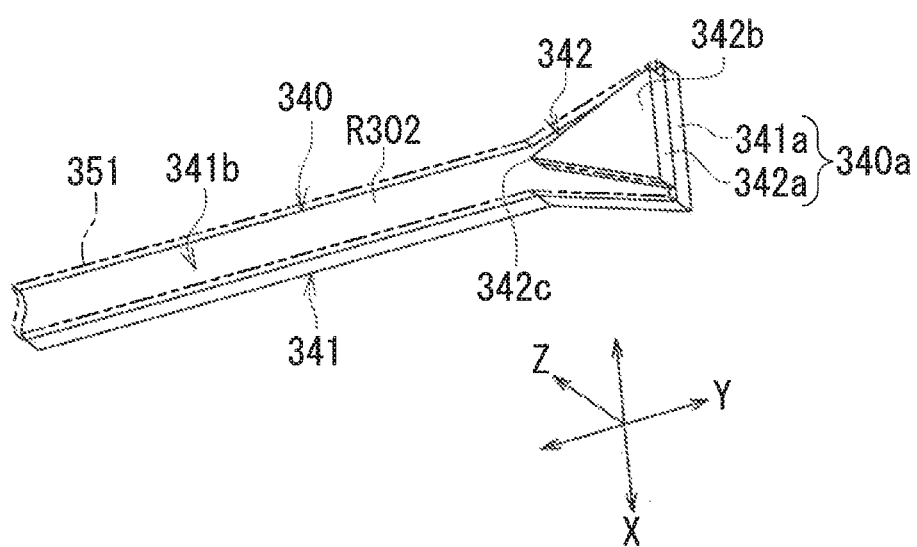
FIG. 26 is a perspective view showing a core and a dielectric layer of a waveguide according to a second embodiment of the invention.

A waveguide according to a second embodiment of the present invention will now be described with reference to FIG. 26. FIG. 26 is a perspective view showing a core and a dielectric layer of the waveguide according to the present embodiment. The thermally-assisted magnetic recording head of the present embodiment includes the waveguide according to the present embodiment, instead of the waveguide according to the first embodiment. The waveguide according to the present embodiment includes a core 340 formed of the first dielectric material, instead of the core 40 of the first embodiment.

The core 340 is provided in the slider 100 of the first embodiment shown in FIG. 3. The core 340 has an entrance end 340a located in the rear surface 80b (see FIG. 3). The core 340 includes a first layer 341 and a second layer 342. The first layer 341 and the second layer 342 are stacked in the Z direction. The first layer 341 lies on the cladding layer 19 (see FIG. 3). The first layer 341 extends from the rear surface 80b toward the medium facing surface 80a (see FIG. 3).

The second layer 342 has a bottom surface, a top surface 342b, a rear end face 342a located in the rear surface 80b, a front end 342c opposite to the rear end face 342a, and two side surfaces. The bottom surface and the top surface 342b of the second layer 342 are parallel to the XY plane. The rear end face 342a constitutes a portion of the entrance end 340a. The two side surfaces are perpendicular to the top surface 1a (see FIG. 3) of the substrate 1, and are inclined with respect to the YZ plane. The front end 342c is an edge formed by the two side surfaces intersecting each other. The width of the second layer 342 decreases with increasing distance from the rear surface 80b. The thickness (the dimension in the Z direction) of the second layer 342 is substantially constant regardless of distance from the rear surface 80b.

The first layer 341 has a bottom surface, a top surface 341b, a rear end face 341a located in the rear surface 80b, a front end face opposite to the rear end face 341a, and two side surfaces. The bottom surface and the top surface 341b of the first layer 341 are parallel to the XY plane. When viewed in the Z direction, the top surface 342b of the second layer 342 lies entirely within the confines of the edges of the top surface 341b. The rear end face 341a constitutes another portion of the entrance end 340a. The front end face of the first layer 341 is located in the medium facing surface 80a (see FIG. 3). The two side surfaces are perpendicular to the top surface 1a (see FIG. 3) of the substrate 1. The width of the first layer 341 gradually decreases with increasing distance from the rear surface 80b, and then becomes constant. The thickness (the dimension in the Z direction) of the first layer 341 is substantially constant regardless of distance from the rear surface 80b.

The top surface 341b of the first layer 341 includes a first region with which the bottom surface of the second layer 342 is in contact, and a second region R302.

The plasmon generator 23 (see FIG. 2 and FIG. 3) is disposed above the top surface 341b of the first layer 341. The cladding layer 22 (see FIG. 2 and FIG. 3) is interposed between the top surface 341b of the first layer 341 and the plasmon exciting section 23b (see FIG. 2) of the plasmon generator 23.

The core 340 includes a single-layered portion in which the second layer 342 is not present when viewed in the Z direction, and a two-layered portion in which the first layer 341 and the second layer 342 are present when viewed in the Z direction.

The core 340 has the function of changing the beam diameter of the light propagating therethrough. This function is performed by the two-layered portion of the core 340. Specifically, laser light emitted from the exit portion 112a (see FIG. 3) of the laser diode 110 enters the first layer 341 and the second layer 342 through the entrance end 340a. The laser light propagating through the second layer 342 gradually moves to the first layer 341 as it approaches the front end 342c of the second layer 342. This causes the laser light propagating through the first layer 341 and the second layer 342 to become smaller in beam diameter as it propagates through the two-layered portion.

The laser light having entered the core 340 through the entrance end 340a propagates through the two-layered portion and the single-layered portion sequentially, and reaches the vicinity of the plasmon generator 23. The top surface 341b of the first layer 341 generates evanescent light from the laser light propagating through the core 340.

The thermally-assisted magnetic recording head according to the present embodiment includes a laser diode that emits laser light of TM-mode, instead of the laser diode 110. The laser diode is fixed to the slider 100 (see FIG. 3) in such an orientation that the electric field of the laser light impinging on the entrance end 340a of the core 340 oscillates in a direction perpendicular to the XY plane. This causes the electric field of the laser light propagating through the core 340 oscillates in the direction perpendicular to the XY plane, thereby enabling the plasmon generator 23 to generate surface plasmons of high intensity.

The waveguide according to the present embodiment may further include a dielectric layer 351 formed of the third dielectric material. Where the waveguide includes the dielectric layer 351, the dielectric layer 351 is interposed between the second region R302 of the top surface 341b of the first layer 341 and the cladding layer 21 (see FIG. 3). The dielectric layer 351 is not present between the first region of the top surface 341b of the first layer 341 and the bottom surface of the second layer 342.

The remainder of configuration, function and effects of the present embodiment are similar to those of the first embodiment.

The present invention is not limited to the foregoing embodiments, and various modifications may be made thereto. As far as the requirements of the appended claims are met, the shape and configuration of the core 40 or 340 are not limited to the respective examples illustrated in the foregoing embodiments, but can be freely chosen.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A manufacturing method for a waveguide, the waveguide comprising: a core allowing light to propagate therethrough; and a cladding around the core, wherein
the core is formed of a first dielectric material,
the cladding is formed of a second dielectric material having a relative permittivity lower than that of the first dielectric material,
the core includes a first layer and a second layer stacked in a first direction,
each of the first layer and the second layer has a top surface and a bottom surface, and
the top surface of the first layer includes a first region with which the bottom surface of the second layer is in contact, and a second region with which the bottom surface of the second layer is not in contact,
the manufacturing method comprising:
forming the core; and
forming the cladding, wherein
forming the core includes:
a step of forming an initial first layer which later becomes the first layer, the initial first layer having a top surface including the first region and the second region;
a step of forming an etching stopper layer on the second region of the top surface of the initial first layer;
a step of forming an initial second layer on the initial first layer and the etching stopper layer;
a first etching step of etching the initial second layer and the initial first layer so as to make the initial first layer into the first layer; and
a second etching step of etching the initial second layer until the etching stopper layer is exposed, so as to make the initial second layer into the second layer.

2. The manufacturing method for the waveguide according to claim 1, wherein the etching stopper layer is formed of a third dielectric material different from the second dielectric material and having a relative permittivity lower than that of the first dielectric material.

3. The manufacturing method for the waveguide according to claim 1, wherein the first etching step is performed by reactive ion etching.

4. The manufacturing method for the waveguide according to claim 1, wherein the second etching step is performed by reactive ion etching.

5. The manufacturing method for the waveguide according to claim 1, wherein forming the core further includes a step of removing at least part of the etching stopper layer after the second etching step.

6. The manufacturing method for the waveguide according to claim 1, wherein the top surface of the second layer lies entirely within the confines of edges of the top surface of the first layer when viewed in the first direction.

7. The manufacturing method for the waveguide according to claim 1, wherein the core has a function of rotating a polarization direction of the light propagating therethrough.

8. The manufacturing method for the waveguide according to claim 1, wherein the core has a function of changing a beam diameter of the light propagating therethrough.

9. A waveguide comprising:
a core allowing light to propagate therethrough; and
a cladding around the core, wherein
the core is formed of a first dielectric material,
the cladding is formed of a second dielectric material having a relative permittivity lower than that of the first dielectric material,
the core includes a first layer and a second layer stacked in a first direction,
each of the first layer and the second layer has a top surface and a bottom surface, and
the top surface of the first layer includes a first region with which the bottom surface of the second layer is in contact, and a second region with which the bottom surface of the second layer is not in contact,
the waveguide further comprising a dielectric layer interposed between the second region and the cladding,
wherein the dielectric layer is formed of a third dielectric material different from the second dielectric material and having a relative permittivity lower than that of the first dielectric material.

10. The waveguide according to claim 9, wherein the top surface of the second layer lies entirely within the confines of edges of the top surface of the first layer when viewed in the first direction.

11. The waveguide according to claim 9, wherein the core has a function of rotating a polarization direction of the light propagating therethrough.

12. The waveguide according to claim 9, wherein the core has a function of changing a beam diameter of the light propagating therethrough.

* * * * *